US012810809B2

(12) United States Patent
Kim et al.

(10) Patent No.: US 12,810,809 B2
(45) Date of Patent: Nov. 24, 2026

(54) DISPLAY APPARATUS AND ELECTRONIC DEVICE INCLUDING THE SAME

(71) Applicant: SAMSUNG DISPLAY CO., LTD., Yongin-si (KR)

(72) Inventors: Kyungho Kim, Yongin-si (KR); Byungchang Yu, Yongin-si (KR); Jinjoo Ha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/214,288

(22) Filed: May 21, 2025

(65) Prior Publication Data

US 2026/0045224 A1 Feb. 12, 2026

(30) Foreign Application Priority Data

Aug. 7, 2024 (KR) ........................ 10-2024-0105709

(51) Int. Cl.
*G09G 3/3266* (2016.01)
*G09G 3/32* (2016.01)

(52) U.S. Cl.
CPC ............ *G09G 3/3266* (2013.01); *G09G 3/32* (2013.01); *G09G 2300/0426* (2013.01); *G09G 2300/0814* (2013.01); *G09G 2300/0819* (2013.01); *G09G 2310/0267* (2013.01); *G09G 2310/0291* (2013.01); *G09G 2320/0257* (2013.01); *G09G 2330/022* (2013.01)

(58) Field of Classification Search
CPC ................... G09G 3/32; G09G 3/3266; G09G 2300/0426; G09G 2300/0814; G09G 2300/0819; G09G 2310/0267; G09G 2310/0291; G09G 2320/022; G09G 2320/0257
See application file for complete search history.

(56) References Cited

U.S. PATENT DOCUMENTS 10,510,301 B2 12/2019 Na et al.
11,367,399 B2 6/2022 Jung et al.
11,508,312 B2 11/2022 Kim et al.
2020/0203382 A1* 6/2020 Jung .................... G09G 3/3266

(Continued)

FOREIGN PATENT DOCUMENTS

KR 10-2022-0082338 A 6/2022
KR 10-2022-0085418 A 6/2022

(Continued)

*Primary Examiner* — Priyank J Shah
(74) *Attorney, Agent, or Firm* — F. CHAU & ASSOCIATES, LLC

(57) ABSTRACT

A display apparatus includes a substrate, a first logic circuit, a second logic circuit, a first buffer circuit, and a second buffer circuit. The substrate includes a display area and a peripheral area. The first logic circuit and second logic circuit are arranged in the peripheral area. The first buffer circuit and the second buffer circuit are arranged in the display area. The first buffer circuit is electrically connected to the first logic circuit and outputs a first scan signal. The second buffer circuit is electrically connected to the second logic circuit and outputs a second scan signal. The first scan signal and the second scan signal control transistors in a pixel circuit. In addition, a light-emitting diode arranged on the first buffer circuit and is electrically connected to the pixel circuit.

20 Claims, 14 Drawing Sheets

(56) References Cited

U.S. PATENT DOCUMENTS

| | | | | |
|---|---|---|---|---|
| 2022/0189410 | A1* | 6/2022 | Kim | H10K 59/131 |
| 2024/0185786 | A1* | 6/2024 | Kwon | G09G 3/2092 |
| 2024/0395213 | A1* | 11/2024 | Fan | G09G 3/32 |

FOREIGN PATENT DOCUMENTS

| | | | |
|---|---|---|---|
| KR | 10-2566782 | B1 | 8/2023 |
| KR | 10-2612390 | B1 | 12/2023 |

* cited by examiner

DISPLAY APPARATUS AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2024-0105709, filed on Aug. 7, 2024, in the Korean Intellectual Property Office, the disclosure of which is incorporated by reference herein in its entirety.

BACKGROUND

1. Field

One or more embodiments relate to a display apparatus and an electronic device including a display apparatus.

2. Description of the Related Art

A display apparatus includes a plurality of pixels arranged in a display area. Each of the pixels may include a light-emitting diode and a pixel circuit configured to control the brightness of light emitted from the light-emitting diode. The pixel circuit may include transistors and capacitors connected to lines such as data lines, scan lines, voltage lines, etc. The display apparatus further includes a data driving circuit, which is configured to apply data signals to the data lines, and a scan driving circuit configured to apply a scan signal to each of the scan lines. The data driving circuit and the scan driving circuit may be entirely arranged in a peripheral area outside the display area.

SUMMARY

According to one or more embodiments, a display apparatus includes a substrate comprising a display area and a peripheral area outside the display area; a scan driving circuit including a logic circuit unit and a buffer circuit unit; and a pixel circuit arranged in the display area. The logic circuit unit includes a first logic circuit arranged in the peripheral area and a second logic circuit arranged in the peripheral area. The buffer circuit unit includes a first buffer circuit and a second buffer circuit. The first buffer circuit is arranged on the pixel circuit in the display area and is electrically connected to the first logic circuit and configured to output a first scan signal. The second buffer circuit is arranged on the pixel circuit in the display area and is electrically connected to the second logic circuit and configured to output a second scan signal. The display apparatus further comprises a light-emitting diode arranged on the first buffer circuit in the display area and electrically connected to the pixel circuit.

The second logic circuit may be arranged on the first logic circuit in the peripheral area.

The pixel circuit may include a plurality of transistors, the first buffer circuit may be electrically connected to a gate electrode of one of the plurality of transistors through a first scan line, and the second buffer circuit may be electrically connected to a gate electrode of another one of the plurality of transistors through a second scan line.

The display apparatus may further include a third logic circuit arranged on the first logic circuit, wherein the first logic circuit and the third logic circuit may be electrically connected to each other, and the first buffer circuit may be configured to output the first scan signal.

The pixel circuit may include a first transistor arranged between a driving voltage line and the light-emitting diode and including a first gate electrode and a second transistor arranged between a data line and the first gate electrode, wherein a gate electrode of the second transistor may be electrically connected to the first buffer circuit through a first scan line.

The pixel circuit may include a first transistor including a first gate electrode, a second transistor arranged between a data line and the first gate electrode, a third transistor arranged between a reference voltage line and the first gate electrode, a fourth transistor arranged between an initialization voltage line and the light-emitting diode, a fifth transistor arranged between a driving voltage line and the first transistor, and a sixth transistor arranged between the light-emitting diode and the first transistor.

The display apparatus may further include a third logic circuit and a fourth logic circuit which are arranged in the peripheral area, a fifth logic circuit and a sixth logic circuit which are arranged on the first logic circuit, the third logic circuit, and the fourth logic circuit in the peripheral area, a third buffer circuit arranged on the pixel circuit in the display area, the third buffer circuit being electrically connected to the third logic circuit and configured to output a third scan signal, a fourth buffer circuit arranged on the pixel circuit in the display area, the fourth buffer circuit being electrically connected to the fourth logic circuit and configured to output a fourth scan signal, and a fifth buffer circuit arranged on the pixel circuit in the display area, the fifth buffer circuit being electrically connected to the fifth logic circuit and configured to output a fifth scan signal.

The first logic circuit and the sixth logic circuit may be electrically connected to each other, and the first buffer circuit may be configured to output the first scan signal.

The first buffer circuit may be electrically connected to a gate electrode of the second transistor through a first scan line, the second buffer circuit may be electrically connected to a gate electrode of the third transistor through a second scan line, the third buffer circuit may be electrically connected to a gate electrode of the fifth transistor through a third scan line, the fourth buffer circuit may be electrically connected to a gate electrode of the sixth transistor through a fourth scan line, and the fifth buffer circuit may be electrically connected to a gate electrode of the fourth transistor through a fifth scan line.

The pixel circuit may be provided in a plural number in a plurality of pixel circuit rows, and the first to fifth buffer circuits may be arranged for each of the plurality of pixel circuit rows.

The pixel circuit may be provided in a plural number in a plurality of pixel circuit rows, the first buffer circuit may be arranged for each of the plurality of pixel circuit rows, the third buffer circuit and the fourth buffer circuit may be arranged in an odd-numbered pixel circuit row from among the plurality of pixel circuit rows, and the second buffer circuit and the fifth buffer circuit may be arranged in an even-numbered pixel circuit row from among the plurality of pixel circuit rows.

Each of the first logic circuit, the second logic circuit, the pixel circuit, the first buffer circuit, and the second buffer circuit may include an oxide-based semiconductor layer.

According to one or more embodiments, a display apparatus includes a substrate including a display area and a peripheral area outside the display area, a first layer stack arranged on the substrate, a second layer stack arranged on the first layer stack, and a light-emitting diode layer arranged on the second layer stack, wherein the first layer stack includes a first logic circuit arranged in the peripheral area and a pixel circuit arranged in the display area, the second layer stack includes a second logic circuit arranged in the peripheral area and a first buffer circuit and a second buffer circuit which are arranged in the display area, the pixel circuit includes a plurality of transistors, the first buffer circuit is electrically connected to the first logic circuit and configured to output a first scan signal to control one of the plurality of transistors of the pixel circuit in the display area, and the second buffer circuit is electrically connected to the second logic circuit and configured to output a second scan signal, the second scan signal to control another one of the plurality of transistors of the pixel circuit in the display area.

Each of the first layer stack and the second layer stack may include an oxide-based semiconductor layer.

The pixel circuit may include a plurality of transistors, the first buffer circuit may be electrically connected to a gate electrode of one of the plurality of transistors through a first scan line, and the second buffer circuit may be electrically connected to a gate electrode of another of the plurality of transistors through a second scan line.

The first layer stack may further include a third logic circuit and a fourth logic circuit which are arranged in the peripheral area, the second layer stack may further include a fifth logic circuit and a sixth logic circuit which are arranged in the peripheral area and a third buffer circuit, a fourth buffer circuit, and a fifth buffer circuit which are arranged in the display area, and the third buffer circuit may be electrically connected to the third logic circuit and configured to output a third scan signal, the fourth buffer circuit may be electrically connected to the fourth logic circuit and configured to output a fourth scan signal, and the fifth buffer circuit may be electrically connected to the fifth logic circuit and configured to output a fifth scan signal.

The first logic circuit and the sixth logic circuit may be electrically connected to each other, and the first buffer circuit may be configured to output the first scan signal.

The pixel circuit may include a first transistor including a first gate electrode and a second transistor arranged between a data line and the first gate electrode, and the first buffer circuit may be electrically connected to a gate electrode of the second transistor through a first scan line.

The pixel circuit may include a first transistor including a first gate electrode, a second transistor arranged between a data line and the first gate electrode, a third transistor arranged between a reference voltage line and the first gate electrode, a fourth transistor arranged between an initialization voltage line and a light-emitting diode of the light-emitting diode layer, a fifth transistor arranged between a driving voltage line and the first transistor, and a sixth transistor arranged between the light-emitting diode and the first transistor.

The second buffer circuit may be electrically connected to a gate electrode of the third transistor through a second scan line, the third buffer circuit may be electrically connected to a gate electrode of the fifth transistor through a third scan line, the fourth buffer circuit may be electrically connected to a gate electrode of the sixth transistor through a fourth scan line, and the fifth buffer circuit may be electrically connected to a gate electrode of the fourth transistor through a fifth scan line.

The pixel circuit may be provided in a plural number in a plurality of pixel circuit rows, and the first buffer circuit may be arranged for each of the plurality of pixel circuit rows.

The third buffer circuit and the fourth buffer circuit may be arranged in an odd-numbered pixel circuit row from among the plurality of pixel circuit rows, and the second buffer circuit and the fifth buffer circuit may be arranged in an even-numbered pixel circuit row from among the plurality of pixel circuit rows.

According to one embodiment, an electronic device includes a display apparatus, and a power supply circuit configured to supply power to the display apparatus. The display apparatus includes a substrate comprising a display area and a peripheral area outside the display area; a scan driving circuit including a logic circuit unit and a buffer circuit unit; and a pixel circuit arranged in the display area. The logic circuit unit includes a first logic circuit arranged in the peripheral area and a second logic circuit arranged in the peripheral area. The buffer circuit unit includes a first buffer circuit and a second buffer circuit. The first buffer circuit is arranged on the pixel circuit in the display area and is electrically connected to the first logic circuit and configured to output a first scan signal. The second buffer circuit is arranged on the pixel circuit in the display area and is electrically connected to the second logic circuit and configured to output a second scan signal. The display apparatus further comprises a light-emitting diode arranged on the first buffer circuit in the display area and electrically connected to the pixel circuit.

According to one embodiment, a display apparatus includes a display area including pixels; a peripheral area adjacent to the display area; a logic circuit configured to output a first control signal; and a buffer circuit configured to output a second control signal based on the first control signal, wherein the logic circuit and the buffer circuit are included in a scan driving circuit, and wherein the logic circuit is in the peripheral area and the buffer circuit is in the display area at a location between a pixel circuit and a light-emitting element. The logic circuit may output a first control signal, and the buffer circuit may output a second control signal to the pixel circuit based on the first control signal. The second control signal may be a scan signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
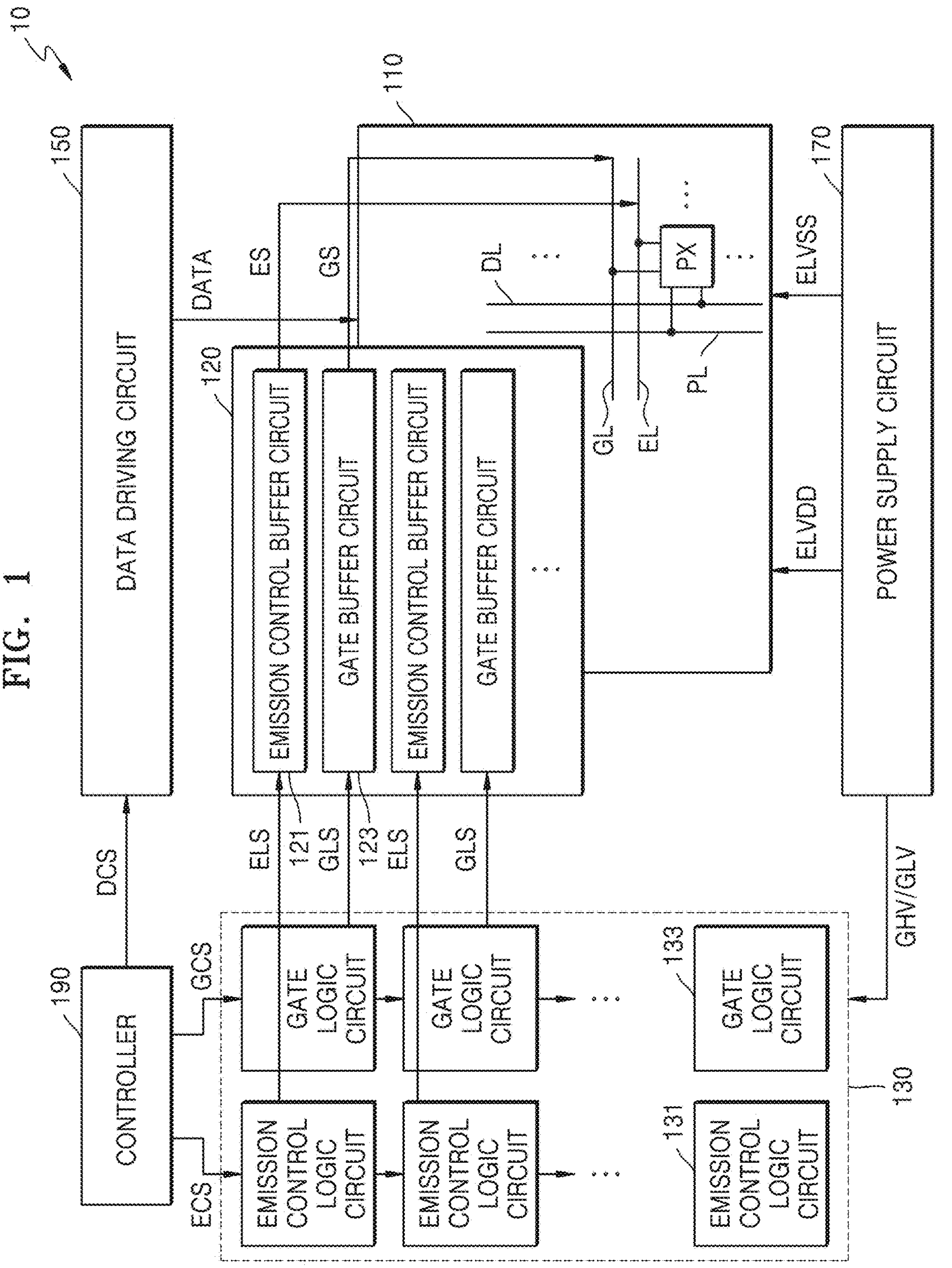
FIG. 1 is a schematic view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

While the disclosure is capable of having various modifications and alternative forms, embodiments thereof are shown by way of example in the drawings and will herein be described in detail. The effects and characteristics of the disclosure and methods of achieving the same will become apparent by referring to the embodiments described below in detail with reference to the drawings. However, the disclosure is not limited to the embodiments disclosed hereinafter and may be realized in various forms.

Hereinafter, embodiments will be described in detail by referring to the accompanying drawings, wherein, when describing the accompanying drawings, elements that are the same as or corresponding to each other will be assigned the same reference numerals, repeated descriptions thereof will not be given.

It will be understood that although the terms "first," "second," etc. may be used herein to describe various components, these components should not be limited by these terms. These components are only used to distinguish one component from another.

As used herein, the singular expressions "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or element is referred to as being formed "on" another layer, area, or element, it can be directly or indirectly formed on the other layer, region, or element. That is, for example, intervening layers, regions, or elements may be present.

In this specification, it will be understood that when an element, an area, or a layer is referred to as being connected to another element, area, or layer, it can be directly and/or indirectly connected to the other element, area, or layer. For example, it will be understood in this specification that when an element, an area, or a layer is referred to as being in contact with or being electrically connected to another element, area, or layer, it can be directly and/or indirectly in contact with or electrically connected to the other element, area, or layer.

In this specification, an x direction, a y direction, and a z direction are not limited to directions in three axes on a rectangular coordinate system and may be interpreted in a broader sense. For example, the x direction, the y direction, and the z direction may be orthogonal to one another or may refer to different directions that are not orthogonal to one another.

In this specification, the expression "in a plan view" denotes that an object part is downwardly viewed (for example, in a direction perpendicular to an upper surface of a substrate), and the expression "in a cross-sectional view" denotes that a vertical cross-section of an object part is laterally viewed.

In this specification, that a first element "overlaps" a second element denotes that the first element is located above or below the second element so that at least portions of the first element and the second element overlap each other in a plan view.

In this specification, the terms "on" and "off" used in relation to a device state refer to an activated state of the device and a non-activated state of the device, respectively. The terms "on" and "off" used in relation to a signal received by a device may refer to signals configured to activate the device and non-activate the device, respectively. A device may be activated by a high-level voltage or a low-level voltage. For example, a P-channel transistor (a P-type transistor) may be activated by a low-level voltage, and an N-channel transistor (an N-type transistor) may be activated by a high-level voltage. Thus, it shall be understood that "on" voltages with respect to the P-type transistor and the N-type transistor may be opposite voltages (low versus high) to each other.

In this specification, when a certain embodiment may be implemented differently, a specific process order may be performed differently from the described order. For example, two consecutively described processes may be performed substantially at the same time or performed in an order opposite to the described order.

Also, for convenience of explanation, elements in the drawings may have exaggerated or reduced sizes. For example, sizes and thicknesses of the elements in the drawings are randomly indicated for convenience of explanation, and thus, the disclosure is not necessarily limited to the illustrations of the drawings.

A display apparatus may include a display panel that is partitioned into a peripheral area and a display area. The display area includes a plurality of pixels for emitting light to form an image. The peripheral area includes a scan driving circuit to control operation of each of the pixels. Because the entire scan driving circuit is included in the peripheral area, the size of the peripheral area may be large, which, in turn, may increase the size and degrade the aesthetic appearance of the display apparatus.

In accordance with one or more embodiments, a display apparatus is provided which arranges a portion of the scan driving circuit in the display area of a display panel. For example, the scan driving circuit may include a logic circuit unit and a buffer circuit unit. The logic circuit unit may include a gate logic circuit and an emission control logic circuit. The buffer circuit unit may include a gate buffer circuit and an emission control buffer circuit.

In operation, gate logic circuit provides a gate logic signal to the gate buffer circuit, and the emission control logic circuit provides an emission control logic signal to the emission control buffer circuit. Based on these logic signals, the gate buffer circuit outputs gate signals and the emission control buffer circuit outputs emission control signals to control the emission of light from the pixels.

Structurally, the buffer circuit unit is arranged between a pixel circuit and light-emitting device of each of the pixels.

For example, the gate buffer circuit and the emission control buffer circuit are arranged between the pixel circuit and light-emitting device of each of the pixels. Locating the gate buffer circuit and emission control buffer circuit in the display area may allow for a reduction in the size of the peripheral area, which, in turn, may decrease the size and improve the aesthetic appearance of the display apparatus. Moreover, the gate logic circuit and the emission control logic circuit may overlap or one may be formed on the other, which may reduce the size of the peripheral area.

A display apparatus according to embodiments may display a motion image or a static image and may be used as a display screen of an electronic device, some examples of which are described below. In one embodiment, the display apparatus may be a flexible apparatus.

FIG. 1 is a schematic view of a display apparatus 10 according to an embodiment.

Referring to FIG. 1, the display apparatus 10 may include a display unit (or display panel) 110, a buffer circuit unit 120, a logic circuit unit 130, a data driving circuit 150, a power supply circuit 170, and a controller 190.

The display unit 110 and a portion of a scan driving circuit (e.g., the buffer circuit unit 120) may be provided in a display area. By including buffer circuit unit 120 in the display area, the area of the peripheral area PA (see FIG. 2) of the display apparatus 10 may be advantageously reduced, in a manner described in greater detail below. Various conductive lines configured to transmit electrical signals to be applied to circuits in the display area, external circuits electrically connected to pixel circuits, and pads to which a printed circuit board (PCB) or a driver integrated circuit (IC) chip is coupled may be arranged in a peripheral area outside (e.g., at least partially surrounding or adjacent to) the display area. According to an embodiment, the logic circuit unit 130, the data driving circuit 150, the power supply circuit 170, and the controller 190 may be provided in the peripheral area.

A plurality of scan lines, a plurality of data lines DL, a plurality of driving voltage lines PL, and a plurality of pixels PX connected thereto may be arranged in the display unit 110. For example, the plurality of scan lines may extend in a row direction of the pixels PX. The plurality of scan lines may include a plurality of gate lines GL and a plurality of emission control lines EL connected to the plurality of pixels.

The plurality of pixels PX may be arranged in various arrangement forms, for example, a stripe form, a Pentile™ form (a diamond form), a mosaic form, etc., to emit light to display an image. Each pixel PX may include, as a display element, a light-emitting diode, and the light-emitting diode may be connected to a corresponding pixel circuit. The light-emitting diode may include an organic light-emitting diode. The pixel circuit may include a plurality of transistors and at least one capacitor. Each pixel PX may emit color light (e.g., red light, green light, blue light, or white light) through the light-emitting diode. The pixels PX may emit a different combination of light colors (e.g., cyan, magenta, or yellow) in another embodiment. Each pixel PX may be connected to a corresponding gate line from among the plurality of gate lines GL, a corresponding emission control line from among the plurality of emission control lines EL, and a corresponding data line from among the plurality of data lines DL. Each pixel PX may be connected to a corresponding driving voltage line from among the plurality of driving voltage lines PL.

Each of the gate lines GL may transmit a gate signal GS to the pixels PX arranged in the same row. Each of the emission control lines EL may transmit an emission control signal ES to the pixels PX arranged in the same row. Each of the data lines DL may extend in a column direction and may be connected to the pixels PX arranged in the same column. Each of the data lines DL may be synchronized to the gate signal GS and may transmit a data signal to each of the pixels PX in the same column. Each of the driving voltage lines PL may extend in the column direction and may be connected to the pixels PX arranged in the same column.

The display apparatus 10 may include at least one scan driving circuit configured to sequentially supply a scan signal to the plurality of scan lines. For example, the display apparatus 10 may include an emission control driving circuit configured to sequentially supply the emission control signal ES to the emission control lines EL and a gate driving circuit configured to sequentially supply the gate signal GS to the gate lines GL.

One scan driving circuit may include a plurality of stages. Each of the plurality of stages may include a pair of a logic circuit and a buffer circuit. For example, one stage of the emission control driving circuit may include a pair of an emission control logic circuit 131 located in the peripheral area (e.g., PA in FIG. 2) and an emission control buffer circuit 121 located in the display area (e.g., DA in FIG. 2). One stage of the gate driving circuit may include a pair of a gate logic circuit 133 located in the peripheral area and a gate buffer circuit 123 located in the display area.

FIG. 1 illustrates that the display apparatus 10 may include one emission control driving circuit and one gate driving circuit. However, the disclosure is not limited thereto. For example, a plurality of emission control driving circuits and gate driving circuits may be provided.

The buffer circuit unit 120 may include a plurality of emission control buffer circuits 121 and a plurality of the gate buffer circuits 123 coupled to respective stages of the logic circuit unit 130. The buffer circuit unit 120 may be arranged to overlap the display unit 110. According to an embodiment, the emission control buffer circuits 121 and the gate buffer circuits 123 may be arranged between the pixel circuit and the light-emitting diode of the pixel PX. Each of the emission control buffer circuits 121 may output the emission control signal ES to a corresponding emission control line from among the plurality of emission control lines EL. Each of the gate buffer circuits 123 may output the gate signal GS to a corresponding gate line from among the plurality of gate lines GL.

The logic circuit unit 130 may include a plurality of the emission control logic circuits 131 and a plurality of the gate logic circuits 133. The emission control logic circuits 131 may sequentially generate an emission control logic signal ELS in response to a control signal ECS from the controller 190, and may supply the generated emission control logic signal ELS to a corresponding emission control buffer circuit from among the plurality of emission control buffer circuits 121.

Based on the emission control logic signal ELS received from the emission control logic circuit 131, the emission control buffer circuit 121 may be configured to output the emission control signal ES to the corresponding emission control line EL. According to an embodiment, the emission control logic signal ELS may include voltages of one or more control nodes of the emission control logic circuit 131. For example, the emission control buffer circuit 121 may include a pull-up transistor and a pull-down transistor, and the voltage of each of the control nodes may be supplied to a gate of the pull-up transistor or a gate of the pull-down transistor.

The emission control signal ES may be a gate control signal for controlling turning on and turning off of a transistor, a gate of which is connected to the emission control line EL. For example, the emission control signal ES may be a square wave (or pulse) signal including a gate-on voltage for turning on the transistor and a gate-off voltage for turning off the transistor.

The gate logic circuits 133 may sequentially generate a gate logic signal GLS in response to a control signal GCS from the controller 190, and may supply the generated gate logic signal GLS to a corresponding gate buffer circuit from among the plurality of gate buffer circuits 123.

Based on the gate logic signal GLS received from the gate logic circuit 133, the gate buffer circuit 123 may be configured to output the gate signal GS to the corresponding gate line GL. According to an embodiment, the gate logic signal GLS may be voltages of one or more control nodes of the gate logic circuit 133. For example, the gate buffer circuit 123 may include a pull-up transistor and a pull-down transistor, and the voltage of each of the control nodes may be supplied to a gate of the pull-up transistor or a gate of the pull-down transistor.

The gate signal GS may be a gate control signal for controlling turning on and turning off of a transistor, a gate of which is connected to the gate line GL. The gate signal GS may be a square wave (or pulse) signal including a gate-on voltage for turning on the transistor and a gate-off voltage for turning off the transistor.

The data driving circuit 150 may be connected to the plurality of data lines DL and may supply data signals DATA to the data lines DL according to a control signal DCS from the controller 190. Each data signal DATA supplied to a data line DL may be supplied to a corresponding one of the pixel PX. The data driving circuit 150 may convert input image data having a gradation, which is input from the controller 190, into the data signal DATA in the form of a voltage or a current.

The power supply circuit 170 may supply a driving voltage ELVDD and a common voltage ELVSS to the pixels PX of the display unit 110. The driving voltage ELVDD may be a high-level voltage provided to a pixel electrode (e.g., anode) of the light-emitting diode included in each pixel PX. The common voltage ELVSS may be a low-level voltage provided to an opposite electrode (e.g., cathode) of the light-emitting diode included in each pixel PX.

The power supply circuit 170 may supply an initialization voltage and a reference voltage to the pixels PX of the display unit 110. The power supply circuit 170 may supply a gate-high voltage GHV and a gate-low voltage GLV to the emission control logic circuits 131 and the gate logic circuits 133 of the logic circuit unit 130.

The controller 190 may generate the control signals ECS, GCS, and DCS based on signals input from the outside (e.g., an external system or host) and may supply the generated control signals ECS and GCS to the emission control logic circuit 131 and the gate logic circuit 133, respectively, and the control signal DCS to the data driving circuit 150. The control signal ECS output to the emission control logic circuit 131 and the control signal GCS output to the gate logic circuit 133 may include a plurality of clock signals and a start signal. The control signal DCS output to the data driving circuit 150 may include a plurality of clock signals and a start signal.

The display apparatus 10 may include a display panel (e.g., 110), and the display panel may include a display area and a peripheral area outside the display area. The pixels PX may be arranged in the display area. A portion of each of the scan driving circuits (e.g., buffer circuit unit 120) may be arranged in the display area, and another portion of each of the scan driving circuits may be arranged in the peripheral area. With this arrangement, the area of the peripheral area may be reduced, which, in turn, may reduce the size of (and improve the aesthetic appearance of) the display apparatus. For example, the emission control buffer circuits 121 and the gate buffer circuits 123 may be arranged in the display area to overlap the display area of the display unit 110, and the emission control logic circuits 131 and the gate logic circuits 133 may be arranged in the peripheral area.

Figure 3:
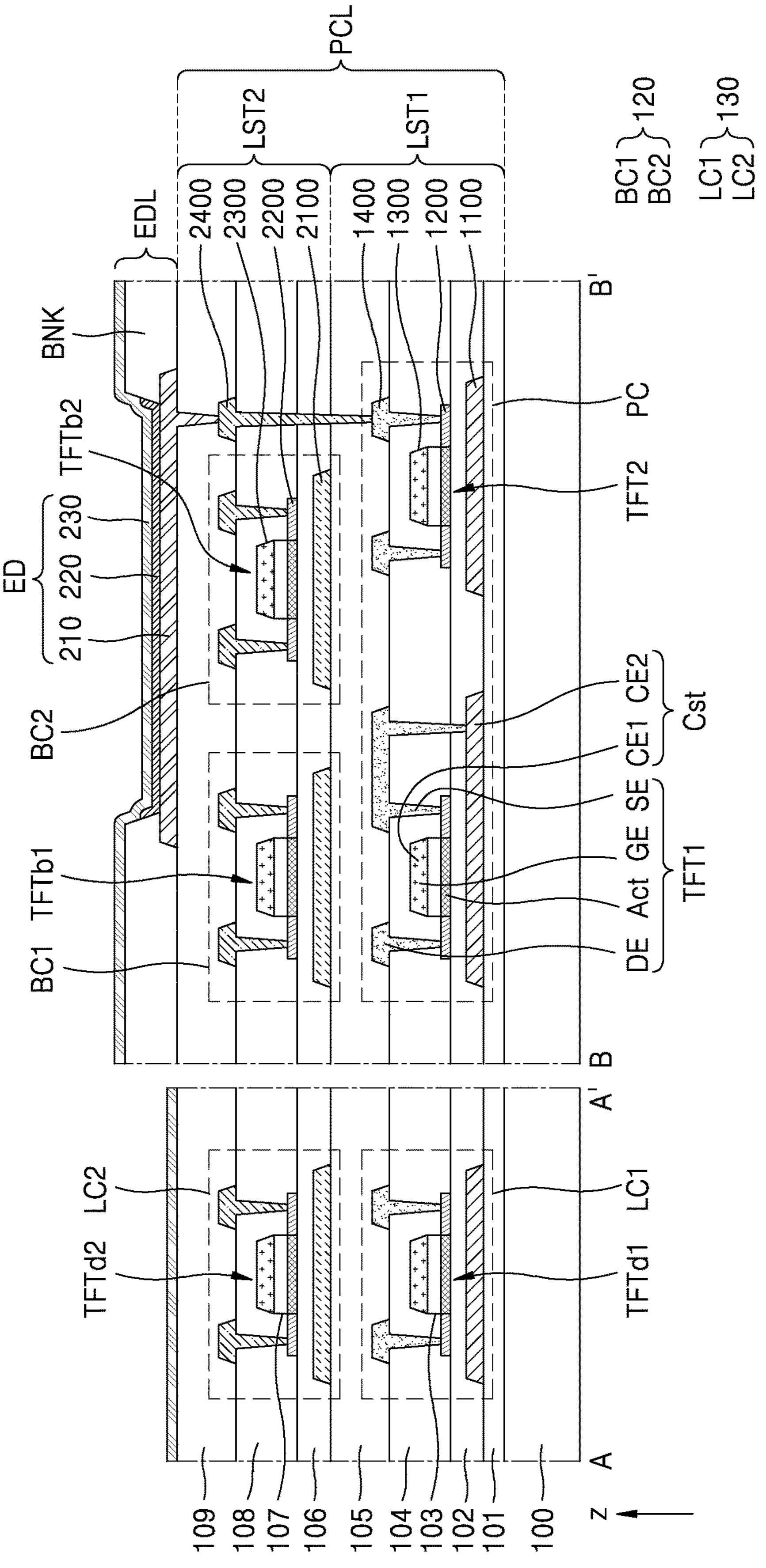
FIG. 3 is a schematic cross-sectional view of a display apparatus according to an embodiment.

The buffer circuit unit 120 and the logic circuit unit 130 may be directly formed on a substrate, e.g., substrate 100 in FIG. 3. The buffer circuit unit 120 and the logic circuit unit 130 may be formed during a process in which the pixel circuit and the light-emitting diode of the pixel PX are formed.

The data driving circuit 150, the power supply circuit 170, and the controller 190 each may be formed as a separate IC chip or may be formed as a single IC chip and may be arranged on a flexible PCB (FPCB) electrically connected to a pad arranged on a side of the substrate. According to another embodiment, the data driving circuit 150, the power supply circuit 170, and the controller 190 may be directly arranged on the substrate using a chip-on-glass (COG) or chip-on-plastic (COP) bonding method.

Hereinafter, an organic light-emitting display apparatus is described as an example of the display apparatus 10 according to an embodiment. However, the display apparatus 10 according to the disclosure is not limited thereto. According to another embodiment, the display apparatus 10 according to the disclosure may include an inorganic light-emitting display apparatus, an inorganic electroluminescent (EL) display apparatus, or a quantum dot light-emitting display apparatus.

Figure 2:
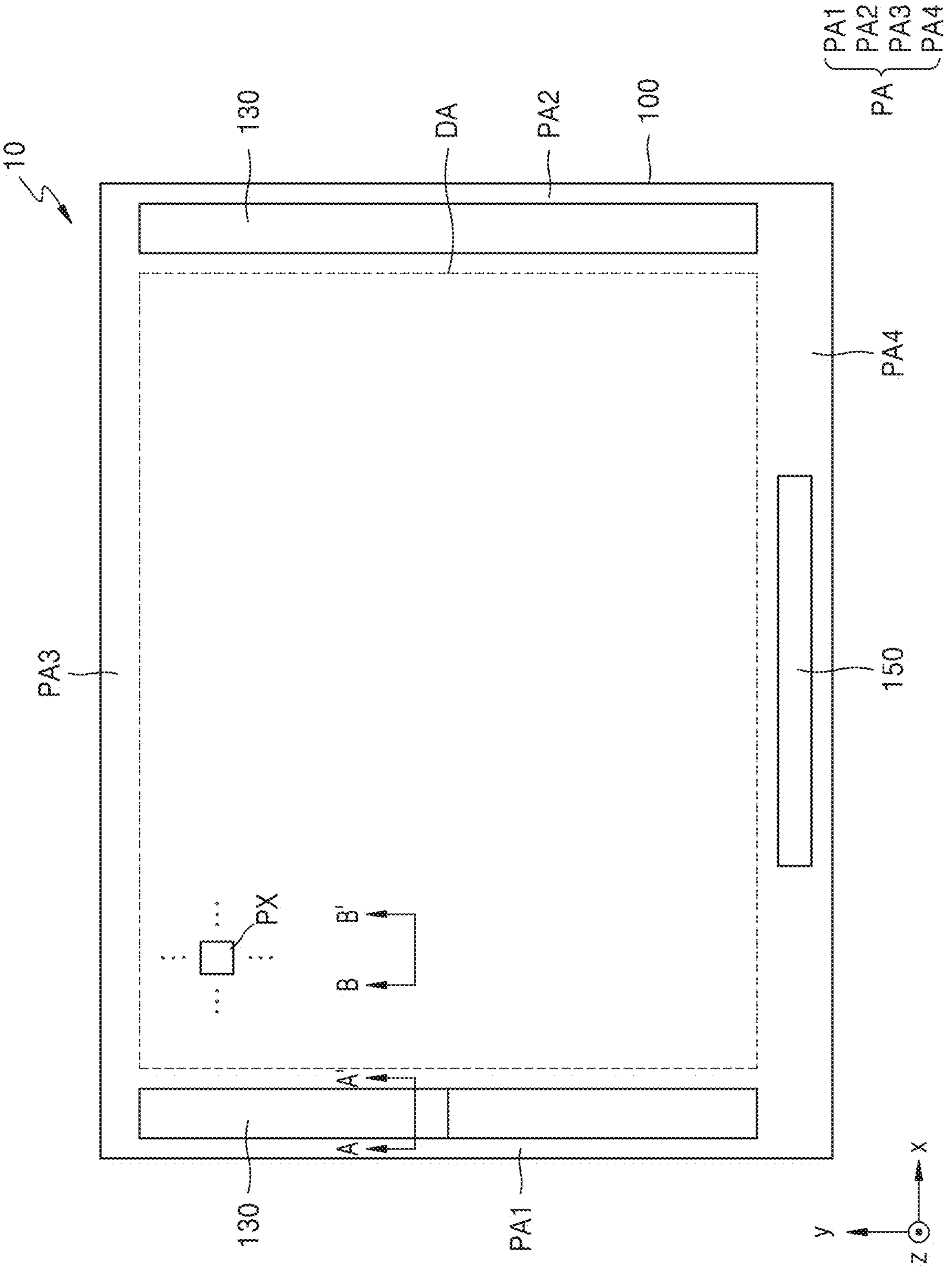
FIG. 2 is a schematic plan view of a display apparatus according to an embodiment.

FIG. 2 is a schematic plan view of the display apparatus 10 according to an embodiment, and FIG. 3 is a schematic cross-sectional view of the display apparatus 10 taken along section lines A-A' and B—B' according to an embodiment.

Referring to FIG. 2, the display apparatus 10 may include a display area DA and a peripheral area PA outside the display area DA. The display apparatus 10 may include a substrate 100, and various elements of the display apparatus 10 may be arranged on the substrate 100. Thus, the substrate 100 may include the display area DA and the peripheral area PA.

The substrate 100 may include glass, metal, or polymer resins. The substrate 100 may be flexible or bendable. The substrate 100 may include, for example, polymer resins, such as polyethersulphone, polyacrylate, polyetherimide, polyethylene naphthalate, polyethylene terephthalate, polyphenylene sulfide, polyarylate, polyimide, polycarbonate, or cellulose acetate propionate. According to an embodiment, the substrate 100 may, for example, have a layered structure including two layers including polymer resins and a barrier layer between the two layers, the barrier layer including an inorganic material (for example, silicon nitride, silicon oxide, or silicon oxynitride). Like this, various modifications of the substrate 100 are possible.

The plurality of pixels PX of the display apparatus 10 may be arranged in the display area DA of the substrate 100. In one embodiment, each pixel may operate as a sub-pixel emitting a color of light, e.g., red light, green light, blue light, or white light. The plurality of pixels PX may be arranged in various arrangement forms, for example, a stripe form, a Pentile™ form (a diamond form), a mosaic form, etc., to realize an image. In one embodiment, the sub-pixels emitting different colors of light may form a unit pixel. A pixel circuit PC and a light-emitting diode ED included in each pixel PX may be arranged in the display area DA.

The buffer circuit unit 120 (e.g., a portion of the scan driving circuit) may be arranged in the display area DA to overlap the pixels PX. As illustrated in FIG. 3, the buffer circuit unit 120 may be arranged between the pixel circuit PC and the light-emitting diode ED of each pixel PX. According to an embodiment, the buffer circuit unit 120 may be arranged on the entire surface of the display area DA. According to another embodiment, the buffer circuit unit 120 may be arranged in only a portion of the display area DA adjacent to the peripheral area PA.

In the peripheral area PA, outer circuits for providing electrical signals to the pixel circuits PC and light-emitting diodes ED of the pixels PX in the display area DA may be arranged. For example, in one embodiment, the logic circuit may be arranged on opposing sides of the display apparatus 10, e.g., the logic circuit unit 130 may be arranged in each of a first peripheral area PA1 and a second peripheral area PA2, with the display area DA therebetween. FIG. 2 illustrates that the logic circuit unit 130 is arranged in each of the first peripheral area PA1 and the second peripheral area PA2 However, the disclosure is not limited thereto. According to another embodiment, the logic circuit unit 130 may be arranged in only one of the first peripheral area PA1 or the second peripheral area PA2.

The data driving circuit 150 may be arranged in a third peripheral area PA3 and/or a fourth peripheral area PA4 connecting the first peripheral area PA1 with the second peripheral area PA2. According to an embodiment, as illustrated in FIG. 2, the data driving circuit 150 may be arranged in the fourth peripheral area PA4. According to another embodiment, the data driving circuit 150 may be arranged in each of the third peripheral area PA3 and the fourth peripheral area PA4.

Referring to FIG. 3, a pixel circuit layer PCL may be arranged on the substrate 100, and a display element layer EDL may be arranged on the pixel circuit layer PCL. The pixel circuit layer PCL may include a first layer stack LST1 and a second layer stack LST2 arranged on the first layer stack LST1. The first layer stack LST1 may include a first logic circuit LC1 arranged in the peripheral area PA and a pixel circuit PC arranged in the display area DA. The second layer stack LST2 may include a second logic circuit LC2 arranged in the peripheral area PA and a first buffer circuit BC1 and a second buffer circuit BC2 arranged in the display area DA. The first logic circuit LC1 may control operation of the first buffer circuit BC1, and the second logic circuit LC2 may control operation of the second buffer circuit BC2. The display element layer EDL may include a light-emitting diode ED.

Each of the first logic circuit LC1 and the second logic circuit LC2 may be a logic circuit included in the logic circuit unit 130. For example, each of the first logic circuit LC1 and the second logic circuit LC2 may be the emission control logic circuit 131 (see FIG. 1) or the gate logic circuit 133 (see FIG. 1). The second logic circuit LC2 may be arranged on the first logic circuit LC1, and the first logic circuit LC1 and the second logic circuit LC2 may overlap each other in a plan view. As explained in greater detail below, each of the first logic circuit LC1 and the second logic circuit LC2 may include at least one transistor for controlling the buffer circuits for each pixel.

Each of the first buffer circuit BC1 and the second buffer circuit BC2 may be a buffer circuit included in the buffer circuit unit 120. For example, each of the first buffer circuit BC1 and the second buffer circuit BC2 may be the emission control buffer circuit 121 (see FIG. 1) or the gate buffer circuit 123 (see FIG. 1). The first buffer circuit BC1 and the second buffer circuit BC2 may be arranged between the pixel circuit PC and the light-emitting diode ED. Because portions of the scan driving circuit (e.g., first buffer circuit BC1 and second buffer circuit BC2) are included in the display area DA, the size of the peripheral area PA may be reduced. In a plan view, the first buffer circuit BC1 and the second buffer circuit BC2 may overlap the pixel circuit PC.

A barrier layer 101 may be arranged on the substrate 100. The barrier layer 101 may include an inorganic insulating material such as silicon oxide, silicon nitride, silicon oxynitride, etc. and may include multi-layers or a single layer including the materials described above.

The pixel circuit PC and the first logic circuit LC1 may be arranged on the barrier layer 101. The pixel circuit PC may be arranged in the display area DA and the first logic circuit LC1 may be arranged in the peripheral area PA. Each of the first logic circuit LC1 and the pixel circuit PC may include at least one thin-film transistor including a channel area, and a gate electrode, a source electrode, and a drain electrode which are on the channel area. For example, the first logic circuit LC1 may include a first logic portion thin-film transistor TFTd1, and the pixel circuit PC may include a first thin-film transistor TFT1 and a second thin-film transistor TFT2. The first thin-film transistor TFT 1 may be a driving transistor and the second thin-film transistor TFT2 may be an emission control transistor, as described in greater detail below. The first logic portion thin-film transistor TFTd1 may be simultaneously formed in a process in which the first thin-film transistor TFT1 and the second thin-film transistor TFT2 are formed.

Each of the first logic portion thin-film transistor TFTd1, the first thin-film transistor TFT1, and the second thin-film transistor TFT2 may include an oxide thin-film transistor including a semiconductor layer including an amorphous or crystalline oxide semiconductor. According to an embodiment, the oxide thin-film transistor may include a low temperature polycrystalline oxide (LTPO) thin-film transistor.

A first metal layer 1100 may be arranged on the barrier layer 101. The first metal layer 1100 may include a lower capacitor electrode CE2 of the storage capacitor Cst. The first metal layer 1100 may include a conductive material, such as Mo, Al, Cu, Ti, etc., and may include multi-layers or a single layer including the materials described above.

A first insulating layer 102 may be arranged on the first metal layer 1100, and a first semiconductor layer 1200 may be arranged on the first insulating layer 102. The first semiconductor layer 1200 may include a channel area Act of the first thin-film transistor TFT1, a channel area of the second thin-film transistor TFT2, and a channel area of the first logic portion thin-film transistor TFTd1. The first semiconductor layer 1200 may include an oxide semiconductor material. The oxide semiconductor material may include a Zn oxide-based material, such as Zn oxide, In—Zn oxide, Ga—In—Zn oxide, etc. According to an embodiment, the oxide semiconductor may include an In—Ga—Zn—O (IGZO) semiconductor. According to another embodiment, the oxide semiconductor may include an In—Sn—Ga—Zn—O (ITGZO) semiconductor.

A second metal layer 1300 may be arranged on the first semiconductor layer 1200. The second metal layer 1300 may include a gate electrode GE of the first thin-film transistor TFT1, a gate electrode of the second thin-film transistor TFT2, and a gate electrode of the first logic portion thin-film transistor TFTd1. The gate electrode of the first thin-film transistor TFT1 may be integrally formed with an upper capacitor electrode CE1 of the storage capacitor Cst. The second metal layer 1300 may include a conductive material, such as Mo, Al, Cu, Ti, etc., and may include multi-layers or a single layer including the materials described above.

A second insulating layer 103 may be arranged between the first semiconductor layer 1200 and the second metal layer 1300. The second insulating layer 103 may serve as a gate dielectric layer of each of the transistors TFT1, TFT2, and TFTd1. According to an embodiment, the second insulating layer 103 may have the shape corresponding to the shape of the second metal layer 1300 in a plan view. According to another embodiment, the second insulating layer 103 may be arranged to cover the entire surface of the substrate 100.

A third insulating layer 104 may be arranged on the second metal layer 1300, and a third metal layer 1400 may be arranged on the third insulating layer 104. The third metal layer 1400 may include a source electrode SE and a drain electrode DE of the first thin-film transistor TFT1, a source electrode and a drain electrode of the second thin-film transistor TFT2, and a source electrode and a drain electrode of the first logic portion thin-film transistor TFTd1. According to an embodiment, the source electrode SE of the first thin-film transistor TFT1 may be connected to the lower capacitor electrode CE2 of the storage capacitor Cst. The third metal layer 1400 may include a conductive material, such as Mo, Al, Cu, Ti, etc., and may include multi-layers or a single layer including the materials described above.

A fourth insulating layer 105 may be arranged on the third metal layer 1400. The first to fourth insulating layers 102 to 105 may include an inorganic insulating material and/or an organic insulating material and may include multi-layers or a single layer including the material described above.

The second logic circuit LC2, the first buffer circuit BC1, and the second buffer circuit BC2 may be arranged on the fourth insulating layer 105. The second logic circuit LC2 may be arranged on the first logic circuit LC1, and the first buffer circuit BC1 and the second buffer circuit BC2 may be arranged on the pixel circuit PC. Each of the second logic circuit LC2, the first buffer circuit BC1, and the second buffer circuit BC2 may include at least one thin-film transistor. For example, the second logic circuit LC2 may include a second logic portion thin-film transistor TFTd2, the first buffer circuit BC1 may include a first buffer portion thin-film transistor TFTb1, and the second buffer circuit BC2 may include a second buffer portion thin-film transistor TFTb2. The second logic portion thin-film transistor TFTd2, the first buffer portion thin-film transistor TFTb1, and the second buffer portion thin-film transistor TFTb2 may be substantially simultaneously formed in the same process.

Each of the second logic portion thin-film transistor TFTd2, the first buffer portion thin-film transistor TFTb1, and the second buffer portion thin-film transistor TFTb2 may include an oxide thin-film transistor including a semiconductor layer including an amorphous or crystalline oxide semiconductor. According to an embodiment, the oxide thin-film transistor may include an LTPO thin-film transistor.

A fourth metal layer 2100 may be arranged on the fourth insulating layer 105. The fourth metal layer 2100 may include a conductive material, such as Mo, Al, Cu, Ti, etc., and may include multi-layers or a single layer including the materials described above.

A fifth insulating layer 106 may be arranged on the fourth metal layer 2100, and a second semiconductor layer 2200 may be arranged on the fifth insulating layer 106. The second semiconductor layer 2200 may include a channel area of the second logic portion thin-film transistor TFTd2, a channel area of the first buffer portion thin-film transistor TFTb1, and a channel area of the second buffer portion thin-film transistor TFTb2. Each of these channel areas may be disposed between doped regions, e.g., source and drain regions, of each of the transistors. The second semiconductor layer 2200 may include an oxide semiconductor material. The oxide semiconductor material may include a Zn oxide-based material, such as Zn oxide, In—Zn oxide, Ga—In—Zn oxide, etc. According to an embodiment, the oxide semiconductor may include an IGZO semiconductor. According to another embodiment, the oxide semiconductor may include an ITGZO semiconductor.

A fifth metal layer 2300 may be arranged on the second semiconductor layer 2200. The fifth metal layer 2300 may include a gate electrode of the second logic portion thin-film transistor TFTd2, a gate electrode of the first buffer portion thin-film transistor TFTb1, and a gate electrode of the second buffer portion thin-film transistor TFTb2. The fifth metal layer 2300 may include a conductive material, such as Mo, Al, Cu, Ti, etc., and may include multi-layers or a single layer including the materials described above.

A sixth insulating layer 107 may be arranged between the second semiconductor layer 2200 and the fifth metal layer 2300 and serve as a gate dielectric. According to an embodiment, the sixth insulating layer 107 may have the shape corresponding to the shape of the fifth metal layer 2300 in a plan view. According to another embodiment, the sixth insulating layer 107 may be arranged to cover the entire surface of the substrate 100.

A seventh insulating layer 108 may be arranged on the fifth metal layer 2300, and a sixth metal layer 2400 may be arranged on the seventh insulating layer 108. The sixth metal layer 2400 may include a source electrode and a drain electrode of the second logic portion thin-film transistor TFTd2, a source electrode and a drain electrode of the first buffer portion thin-film transistor TFTb1, and a source electrode and a drain electrode of the second buffer portion thin-film transistor TFTb2. The sixth metal layer 2400 may include a conductive material, such as Mo, Al, Cu, Ti, etc., and may include multi-layers or a single layer including the materials described above.

An eighth insulating layer 109 may be arranged on the sixth metal layer 2400. The fifth to eighth insulating layers 106 to 109 may include an inorganic insulating material and/or an organic insulating material and may include multi-layers or a single layer including the material described above.

Thus, each of the first layer stack LST1 and the second layer stack LST2 may include at least one semiconductor layer. For example, the first layer stack LST1 may include the first semiconductor layer 1200, and the second layer stack LST2 may include the second semiconductor layer 2200. Also, the first layer stack LST1 may include the first to third metal layers 1100, 1300, and 1400 arranged above or below the first semiconductor layer 1200 and the barrier layer 101 and the first to fourth insulating layers 102, 103, 104, and 105 arranged above or below each of the first to third metal layers 1100, 1300, and 1400. The second layer stack LST2 may include the fourth to sixth metal layers 2100, 2300, and 2400 arranged above or below the second semiconductor layer 2200 and the fifth to eighth insulating layers 106, 107, 108, and 109 arranged above or below each of the fourth to sixth metal layers 2100, 2300, and 2400. According to an embodiment, some of the metal layers and/or some of the insulating layers may be omitted in the first layer stack LST1 and the second layer stack LST2. According to another embodiment, at least one metal layer and/or at least one insulating layer may be added in the first layer stack LST1 or the second layer stack LST2.

According to an embodiment, the first logic circuit LC1 may be connected to (and control) the first buffer circuit BC1 through a first connection line, and the first buffer circuit BC1 may be connected to a gate electrode of one of the thin-film transistors included in the pixel circuit PC through a first scan line. The second logic circuit LC2 may be connected to (and control) the second buffer circuit BC2 through a second connection line, and the second buffer circuit BC2 may be connected to a gate electrode of one of the thin-film transistors included in the pixel circuit PC through a second scan line.

The display element layer EDL may be arranged on the pixel circuit layer PCL. The display element layer EDL may include the light-emitting diode ED. The light-emitting diode ED may include a pixel electrode 210, an opposite electrode 230, and an emission layer 220 arranged between the pixel electrode 210 and the opposite electrode 230.

The pixel electrode 210 may be arranged on the eighth insulating layer 109. The pixel electrode 210 may be connected to the source electrode or the drain electrode of the second thin-film transistor TFT2 through contact metals. The pixel electrode 210 may include a (semi-) transmissive electrode or a reflection electrode. According to an embodiment, the pixel electrode 210 may include a reflective layer including Ag, Mg, Al, Pt, Pd, Au, Ni, Nd, Ir, Cr, and a compound thereof, and a transparent or semi-transparent electrode layer on the reflective layer. The transparent or semi-transparent electrode layer may include at least one selected from the group consisting of indium tin oxide (ITO), indium zinc oxide (IZO), zinc oxide (ZnO), indium oxide ($In_2O_3$), indium gallium oxide (IGO), and aluminum zinc oxide (AZO). According to an embodiment, the pixel electrode 210 may include ITO/Ag/ITO.

A bank layer BNK may be arranged on the eighth insulating layer 109 to cover an edge of the pixel electrode 210. An opening may be defined in the bank layer BNK to expose a central portion of the pixel electrode 210. An emission area of the light-emitting diode ED may be defined by the opening of the bank layer BNK. The bank layer BNK may increase a distance between the edge of the pixel electrode 210 and the opposite electrode 230, thereby preventing the occurrence of arcs, etc., at the edge of the pixel electrode 210. The bank layer BNK may include at least one organic material selected from the group consisting of polyimide, polyamide, acrylic resins, benzocyclobutene (BCB), and phenol resins.

The emission layer 220 may be arranged on the pixel electrode 210. The emission layer 220 may include a high molecular-weight or a low molecular-weight organic material emitting certain color light. According to an embodiment, the emission layer 220 may be patterned to correspond to the pixel electrode 210.

A first functional layer may be arranged between the emission layer 220 and the pixel electrode 210 and a second functional layer may be arranged between the emission layer 220 and the opposite electrode 230. The first functional layer may include a hole transport layer. Alternatively, the first functional layer may include a hole injection layer and a hole transport layer. The second functional layer may include an electron transport layer and/or an electron injection layer. The first functional layer and the second functional layer may be integrally formed to correspond to a plurality of light-emitting diodes ED. The first functional layer or the second functional layer may be omitted.

The opposite electrode 230 may be arranged on the emission layer 220. The opposite electrode 230 may include Li, Ag, Mg, Al, Al—Li, Ca, Mg—In, Mg—Ag, Yb, Ag—Yb, ITO, IZO, or an arbitrary combination thereof. The opposite electrode 230 may include a transmissive electrode, a transflective electrode, or a reflection electrode. The opposite electrode 230 may be integrally formed to correspond to the plurality of light-emitting diodes ED.

An encapsulation layer may be arranged on the display element layer EDL to cover the light-emitting diode ED. The encapsulation layer may include at least one inorganic encapsulation layer and an organic encapsulation layer.

The buffer circuit unit 120 may be arranged in the display area DA to overlap the pixels PX. Thus, only the logic circuit unit 130 of the scan driving circuit may be arranged in the peripheral area PA. This may allow for a reduction in the size of the peripheral area PA. Moreover, the second logic circuit LC2 may be arranged to overlap the first logic circuit LC1, e.g., may be in a stacked arrangement. For example, in one embodiment the second logic circuit LC2 may be disposed over the first logic circuit LC1, or the first logic circuit LC1 may be disposed over the second logic circuit LC2. Thus, the size of the area of the peripheral area PA, which is a dead space, may be reduced. Also, the buffer circuit unit 120 may be arranged in a greater area than when included in the peripheral area PA. Thus, output of the buffer circuits BC1 and BC2 may be improved.

Figure 4:
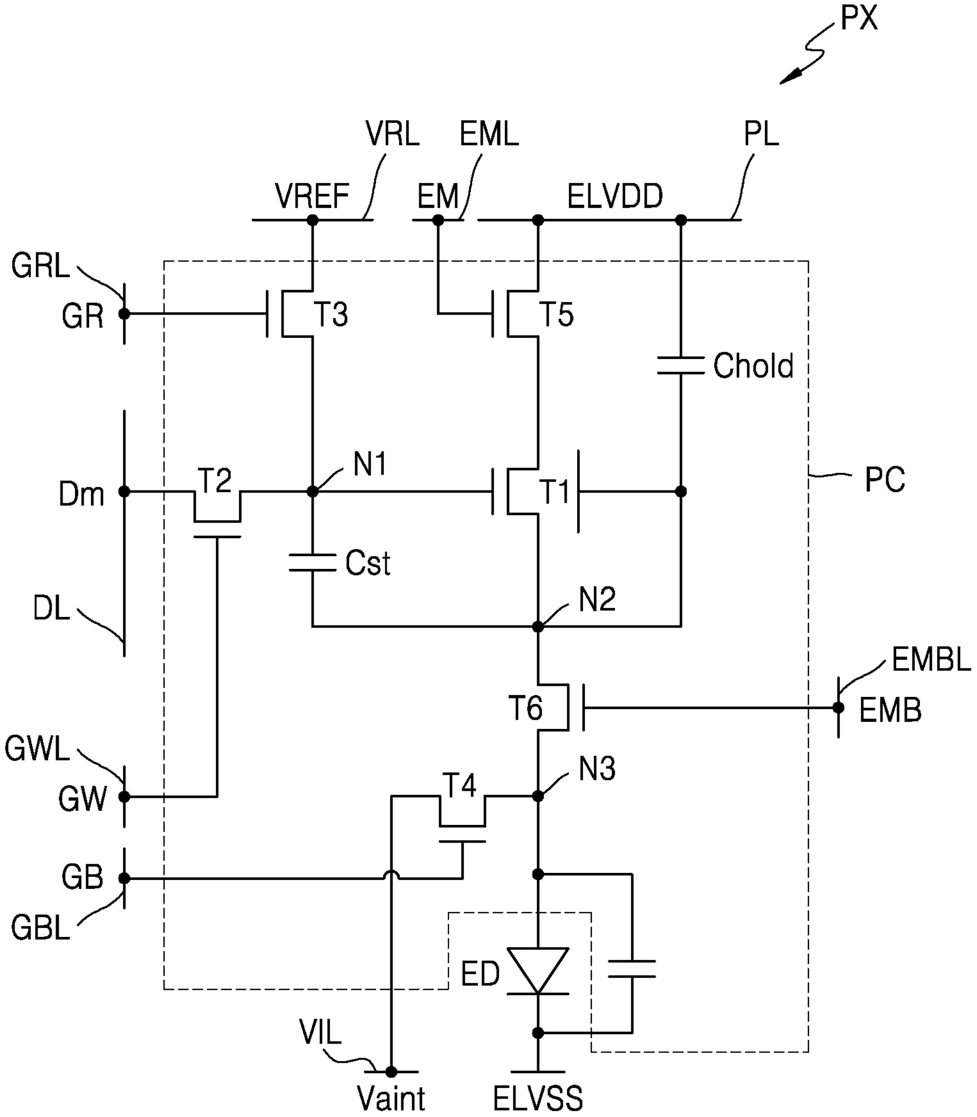
FIG. 4 is an equivalent circuit diagram of a pixel according to an embodiment.

FIG. 4 is an equivalent circuit diagram of a pixel PX which represents a structure of the plurality of pixels of the display apparatus 10 according to an embodiment.

Referring to FIG. 4, the pixel PX may include a light-emitting diode ED and a pixel circuit PC connected to the light-emitting diode ED. The pixel circuit PC may include first to sixth transistors T1 to T6, a storage capacitor Cst, and a hold capacitor Chold. The first transistor T1 may be a driving transistor outputting a driving current corresponding to a data signal Dm, and the second to sixth transistors T2 to T6 may be switching transistors turned on or turned off according to a gate-source voltage or a gate voltage.

The first to sixth transistors T1 to T6 may be thin-film transistors. A first terminal and a second terminal of each of the first to sixth transistors T1 to T6 may be a source or a drain, wherein the second terminal may be a different terminal from the first terminal. For example, when the first terminal is a source, the second terminal may be a drain. The first thin-film transistor TFT1 illustrated in FIG. 3 may correspond to the first (driving) transistor T1, and the second thin-film transistor TFT2 illustrated in FIG. 3 may correspond to the sixth (emission control) transistor T6.

The pixel circuit PC may be connected to scan lines transmitting a scan signal and a data line DL transmitting the data signal Dm. The scan lines may include a first gate line GWL transmitting a first gate signal GW, a second gate line GBL transmitting a second gate signal GB, a third gate line GRL transmitting a third gate signal GR, a first emission control line EML transmitting a first emission control signal EM, and a second emission control line EMBL transmitting a second emission control signal EMB.

Also, the pixel circuit PC may be connected to a driving voltage line PL transmitting a driving voltage ELVDD, a reference voltage line VRL transmitting a reference voltage VREF, and an initialization voltage line VIL transmitting a diode initialization voltage Vaint.

According to an embodiment, the first to sixth transistors T1 to T6 may be provided as n-channel metal-oxide semiconductor field-effect transistors (n-channel MOSFET) (NMOS). According to another embodiment, some of the first to sixth transistors T1 to T6 may be provided as NMOS, and the others may be provided as p-channel metal-oxide semiconductor field-effect transistors (p-channel MOSFET) (PMOS). According to another embodiment, the first to sixth transistors T1 to T6 may be provided as PMOS.

The first to sixth transistors T1 to T6 may include oxide semiconductor transistors including an oxide semiconductor material. The oxide semiconductor material may include a Zn oxide-based material, such as Zn oxide, In—Zn oxide, Ga—In—Zn oxide, etc. According to an embodiment, the oxide semiconductor may include an IGZO semiconductor. According to another embodiment, the oxide semiconductor may include an ITGZO semiconductor.

The oxide semiconductor material may have high carrier mobility and low leakage current, and thus, even when the oxide semiconductor transistor has an increased driving time, the voltage drop may not be high. Thus, the oxide semiconductor transistor may be driven at low frequencies. Also, when the oxide semiconductor transistor is used, a crystallization process by excimer laser annealing (ELA) is not required to form an LTPS semiconductor transistor. Thus, the manufacturing cost of a display apparatus may be reduced.

According to another embodiment, the first to sixth transistors T1 to T6 may include silicon semiconductor transistors. A silicon-based semiconductor material may include polysilicon or amorphous silicon.

The first transistor T1 may be a dual-gate driving transistor which includes a first terminal connected to the driving voltage line PL through the fifth transistor T5, a second terminal connected to a second node N2, a first gate connected to a first node N1, and a second gate connected to the second node N2. The first transistor T1 may receive the data signal Dm according to a switching operation of the second transistor T2 and may supply a driving current to the light-emitting diode ED for light emission.

The second transistor T2 (a data write transistor) may include a gate connected to the first gate line GWL, a first terminal connected to the data line DL, and a second terminal connected to the first node N1. The second transistor T2 may be turned on according to the first gate signal GW received through the first gate line GWL and may perform the switching operation of transmitting, to the first node N1, the data signal Dm transmitted through the data line DL.

The third transistor T3 (a first initialization transistor) may include a gate connected to the third gate line GRL, a first terminal connected to the reference voltage line VRL, and a second terminal connected to the first node N1. The third transistor T3 may be turned on by the third gate signal GR transmitted through the third gate line GRL and may transmit, to the first node N1, the reference voltage VREF transmitted through the reference voltage line VRL to initialize the first node N1.

The fourth transistor T4 (a second initialization transistor) may include a gate connected to the second gate line GBL, a first terminal connected to the initialization voltage line VIL, and a second terminal connected to a third node N3. The fourth transistor T4 may be turned on by the second gate signal GB transmitted through the second gate line GBL and may transmit, to the third node N3, the diode initialization voltage Vaint transmitted through the initialization voltage line VIL to initialize a pixel electrode of the light-emitting diode ED.

The fifth transistor T5 (a first emission control transistor) may include a gate connected to the first emission control line EML, a first terminal connected to the driving voltage line PL, and a second terminal connected to the first terminal of the first transistor T1. The sixth transistor T6 (a second emission control transistor) may include a gate connected to the second emission control line EMBL, a first terminal connected to the second node N2, and a second terminal connected to the third node N3. When the fifth transistor T5 is turned on according to the first emission control signal EM transmitted through the first emission control line EML and the sixth transistor T6 is turned on according to the second emission control signal EMB transmitted through the second emission control line EMBL, the driving current may flow through the light-emitting diode ED.

The storage capacitor Cst may include a first electrode connected to the first node N1 and a second electrode connected to the second node N2. As a storage capacitor, the storage capacitor Cst may store a threshold voltage of the first transistor T1 and a voltage corresponding to the data signal Dm.

The hold capacitor Chold may include a first electrode connected to the driving voltage line PL and a second electrode connected to the second node N2. According to an embodiment, the capacitance of the storage capacitor Cst may be greater than the capacitance of the hold capacitor Chold.

The light-emitting diode ED may include the pixel electrode connected to the third node N3 and an opposite electrode (for example, a cathode) facing the pixel electrode, and the opposite electrode may receive a common voltage ELVSS. The opposite electrode may be a common electrode, which is common to a plurality of pixels PX.

Figure 5A:
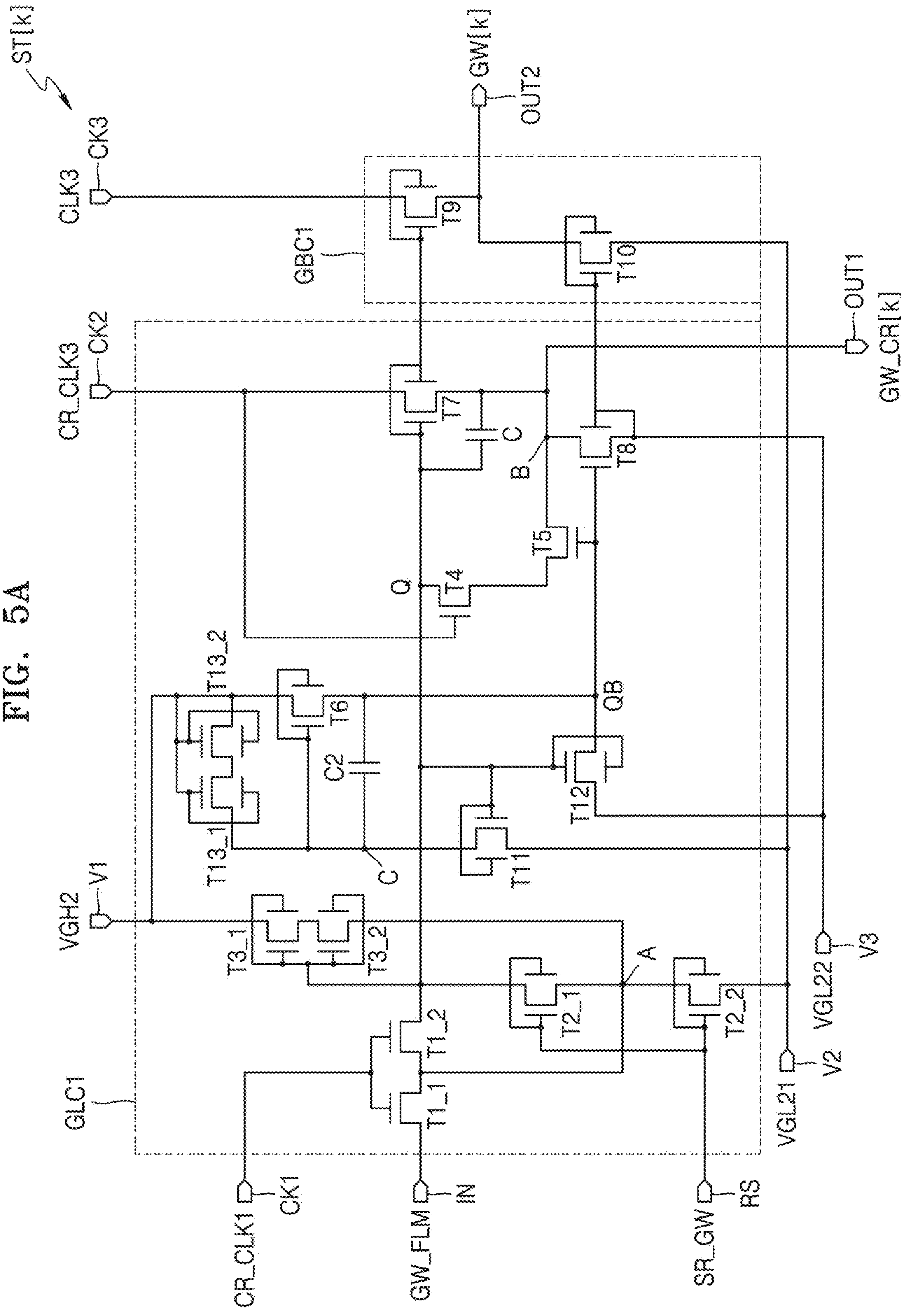
FIG. 5A is a circuit diagram of a stage of a first scan driving circuit according to an embodiment.
Figure 5B:
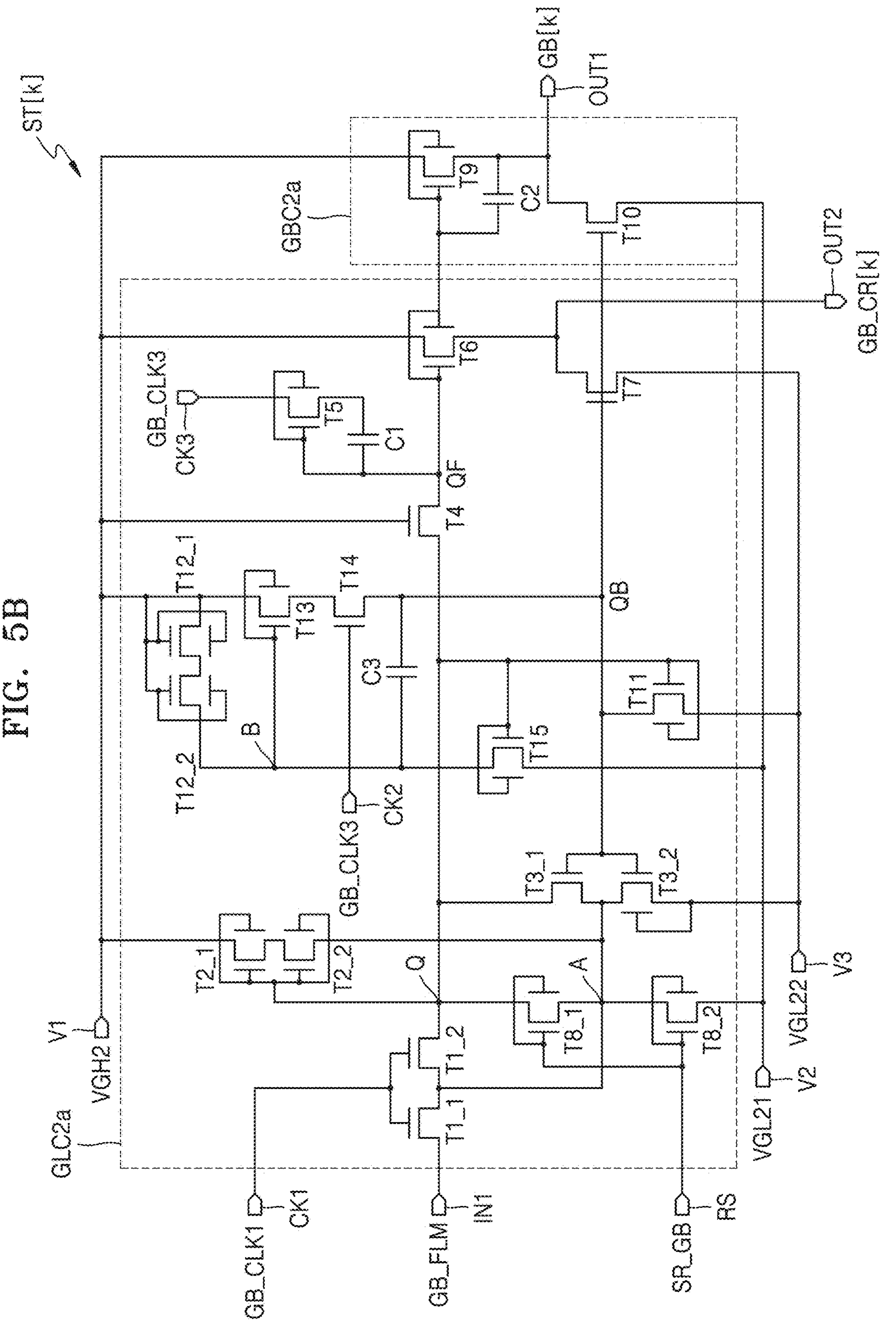
FIG. 5B is a circuit diagram of a stage of a second scan driving circuit according to an embodiment.
Figure 5C:
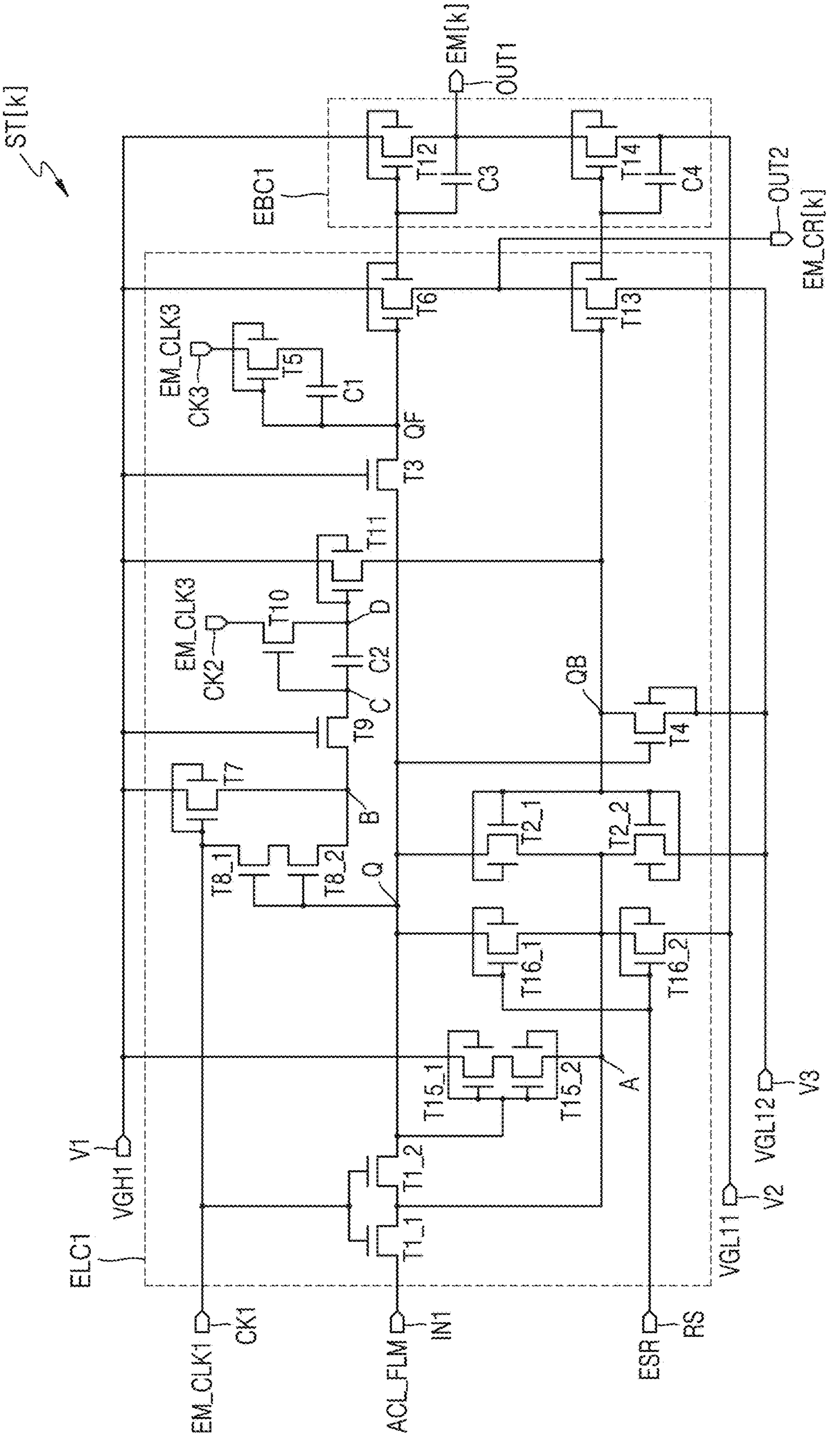
FIG. 5C is a circuit diagram of a stage of a third scan driving circuit according to an embodiment.

FIG. 5A is a circuit diagram of a stage of a first scan driving circuit according to an embodiment, FIG. 5B is a circuit diagram of a stage of a second scan driving circuit according to an embodiment, and FIG. 5C is a circuit diagram of a stage of a third scan driving circuit according to an embodiment.

FIGS. 5A to 5C illustrate the first to third scan driving circuits, each of which may include a logic circuit electrically connected to a corresponding buffer circuit as shown, for example, in FIG. 1. Each of first to third scan driving circuits may include a plurality of stages, and the plurality of stages may sequentially output scan signals to corresponding scan lines. The number of stages ST provided in each of the first to third scan driving circuits may correspond to the number of pixel circuit rows provided in the display unit 110 (see FIG. 1).

Each of the stages may be connected to a scan line of a corresponding row. Each of the stages may receive at least one clock signal and at least one voltage signal and may generate a scan signal and supply the generated scan signal to a connected scan line. Here, a kth stage ST[k] outputting a kth scan signal to a kth scan line is described as an example.

Referring to FIG. 5A, the kth stage ST[k] of the first scan driving circuit may include a first gate logic circuit GLC1 and a first gate buffer circuit GBC1. The first gate logic circuit GLC1 may be included in gate logic circuit 133 and the first gate buffer circuit GBC1 may be included, for example, in the gate buffer circuit 123 shown in FIG. 1. The first gate logic circuit GLC1 may be connected to an input terminal IN, a control signal terminal RS, a first clock terminal CK1, a second clock terminal CK2, a first voltage input terminal V1, a second voltage input terminal V2, a third voltage input terminal V3, and a first output terminal OUT1. The first gate buffer circuit GBC1 may be connected to the first voltage input terminal V1, the second voltage input terminal V2, a third clock terminal CK3, and a second output terminal OUT2. The second output terminal OUT2 outputs a scan signal GW[k] (also referred to as a first gate signal). The scan signal GW[k] may correspond to the scan signal GW in FIG. 4.

Hereinafter, for convenience of explanation, that an arbitrary signal is supplied may denote that a gate-on voltage (for example, a first level voltage which is a high-level voltage for NMOS logic) is supplied, and that an arbitrary signal is not supplied may denote that a gate-off voltage (for example, a second level voltage which is a low-level voltage for NMOS logic) is supplied. A first voltage VGH2 may be the first level voltage, and a second voltage VGL21 and a third voltage VGL22 may be the second level voltage.

A start signal GW_FLM or a carry signal (hereinafter, referred to as a "previous carry signal") output by a previous stage may be input to the input terminal IN. For example, when k is 1 and thus stage ST[1] is an initial stage, the start signal GW_FLM may be input to the input terminal IN of a stage ST[1]. When k is 2 or greater, a carry signal GW_CR [k−1] output from a k−1th stage may be input to the input terminal IN of the kth stage ST[k] as a start signal.

A control signal SR_GW may be input to the control signal terminal RS. When an operation error has occurred in the display apparatus, the control signal SR_GW may be supplied to initialize (reset) the voltages of a first control node Q and a second control node QB of the first gate logic circuit GLC1. By supplying the control signal SR_GW of the gate-on voltage during a certain time period, the first control node Q may be set as the second level voltage and the second control node QB may be set as the first level voltage.

The first voltage VGH2 may be input to the first voltage input terminal V1, the second voltage VGL21 may be input to the second voltage input terminal V2, and the third voltage VGL22 may be input to the third voltage input terminal V3. The second voltage VGL21 may have a lower voltage level than the first voltage VGH2. The third voltage VGL22 may have a lower voltage level than the second voltage VGL21. The first voltage VGH2, the second voltage VGL21, and the third voltage VGL22 may be input from the power supply circuit 170 (see FIG. 1).

A first carry clock signal CR_CLK1 or a second carry clock signal may be input to the first clock terminal CK1, and a third carry clock signal CR_CLK3 or a fourth carry clock signal may be input to the second clock terminal CK2. For example, when k is an odd number, the first carry clock signal CR_CLK1 may be input to the first clock terminal CK1 and the third carry clock signal CR_CLK3 may be input to the second clock terminal CK2. When k is an even number, the second carry clock signal may be input to the first clock terminal CK1 and the fourth carry clock signal may be input to the second clock terminal CK2.

The first carry clock signal CR_CLK1, the second carry clock signal, the third carry clock signal CR_CLK3, and the fourth carry clock signal may be square wave (or pulse) signals repeating pattern of high-level voltages and low-level voltages. The high-level voltage may be a gate-on voltage (e.g., for turning on an N-type transistor) and the low-level voltage may be a gate-off voltage (e.g., for turning off the N-type transistor). The gate-on voltage and the gate-off voltage may have opposite voltages in a PMOS embodiment. The first carry clock signal CR_CLK1, the second carry clock signal, the third carry clock signal CR_CLK3, and the fourth carry clock signal may have substantially the same waveform with shifted phases.

A third clock signal CLK3 or a fourth clock signal may be input to the third clock terminal CK3. For example, when k is an odd number, the third clock signal CLK3 may be input to the third clock terminal CK3, and when k is an even number, the fourth clock signal may be input to the third clock terminal CK3. The third clock signal CLK3 and the fourth clock signal may be square wave (or pulse) signals having a repeating pattern of high-level voltages and low-level voltages. The third clock signal CLK3 and the fourth clock signal may have substantially the same waveform with shifted phases.

The first gate logic circuit GLC1 may control the voltages of the first control node Q and the second control node QB, in response to signals input to the input terminal IN, the first clock terminal CK1, and the control signal terminal RS. The first gate logic circuit GLC1 may include first to eighth transistors T1_1 and T1_2 to T8 and eleventh to thirteenth transistors T11 to T13_1 and T13_2.

The first transistor T1_1 and T1_2 may be connected between the input terminal IN and the first control node Q. The first transistor T1_1 and T1_2 (which is different from the first transistor T1 in the pixel of FIG. 4) may include a plurality of sub-transistors that are connected in series. The sub-transistors may include a pair of a first-1 transistor T1_1 and a first-2 transistor T1_2. Gates of the first-1 transistor T1_1 and the first-2 transistor T1_2 may be connected to the first clock terminal CK1. The first-1 transistor T1_1 and the first-2 transistor T1_2 may be turned on when the first carry clock signal CR_CLK1 having the gate-on voltage is supplied thereto, and may set the voltage of the first control node Q to correspond to the start signal GW_FLM or the voltage of a previous carry signal.

The second transistor T2_1 and T2_2 may be connected between the second voltage input terminal V2 and the first control node Q. The second transistor T2_1 and T2_2 may include a plurality of sub-transistors that are connected in series. The sub-transistors may include a pair of a second-1 transistor T2_1 and a second-2 transistor T2_2. Gates of the second-1 transistor T2_1 and the second-2 transistor T2_2 may be connected to the control signal terminal RS. The second-1 transistor T2_1 and the second-2 transistor T2_2 may be turned on when the control signal SR_GW having the gate-on voltage is supplied thereto, and may set the first control node Q as the second level voltage and the second control node QB as the first level voltage.

The third transistor T3_1 and T3_2 may be connected between the first voltage input terminal V1 and a first node A. The third transistor T3_1 and T3_2 may include a plurality of sub-transistors that are connected in series. The sub-transistors may include a pair of a third-1 transistor T3_1 and a third-2 transistor T3_2. Gates of the third-1 transistor T3_1 and the third-2 transistor T3_2 may be connected to the first control node Q. The third-1 transistor T3_1 and the third-2 transistor T3_2 may be turned on or turned off according to the voltage of the first control node Q. When the third-1 transistor T3_1 and the third-2 transistor T3_2 are turned on, the first voltage VGH2 may be transmitted to the first node A, and thus, leakage current due to the first transistor T1_1 and T1_2 and the second transistor T2_1 and T2_2 that are turned off may be blocked and the voltage level of the first control node Q may be stably maintained.

The fourth transistor T4 and the fifth transistor T5 may be connected between the first control node Q and a second node B. A gate of the fourth transistor T4 may be connected to the second clock terminal CK2, and a gate of the fifth transistor T5 may be connected to the second control node QB. The fourth transistor T4 may be turned on or turned off according to the third carry clock signal CR_CLK3. The fifth transistor T5 may be turned on or turned off according to the voltage of the second control node QB. When the second control node QB is set as the first level (turn-on) voltage and the third carry clock signal CR_CLK3 of the gate-on voltage is supplied to the second clock terminal CK2, the fourth transistor T4 and the fifth transistor T5 may be turned on and may connect the first control node Q with the second node B.

The sixth transistor T6 may be connected between the first voltage input terminal V1 and the second control node QB. A gate of the sixth transistor T6 may be connected to a third node C and may be turned on or turned off according to the voltage of the third node C. A second capacitor C2 may be connected between the third node C and the second control node QB.

The thirteenth transistor T13_1 and T13_2 may be connected between the first voltage input terminal V1 and the third node C. The thirteenth transistor T13_1 and T13_2 may include a plurality of sub-transistors that are connected in series. The sub-transistors may include a pair of a thirteenth-1 transistor T13_1 and a thirteenth-2 transistor T13_2. Gates of the thirteenth-1 transistor T13_1 and the thirteenth-2 transistor T13_2 may be connected to the first voltage input terminal V1.

The eleventh transistor T11 may be connected between the second voltage input terminal V2 and the third node C, and the twelfth transistor T12 may be connected between the third voltage input terminal V3 and the second control node QB. A gate of the eleventh transistor T11 and a gate of the twelfth transistor T12 may be connected to the first control node Q. When the first control node Q is set as the first level (turn-on) voltage, the eleventh transistor T11 may be turned on and may transmit the second voltage VGL21 to the third node C. When the first control node Q is set as the first level voltage, the twelfth transistor T12 may be turned on and may transmit the third voltage VGL22 to the second control node QB.

The seventh transistor T7 may be connected between the second clock terminal CK2 and the second node B. The second node B may be connected to the first output terminal OUT1. A gate of the seventh transistor T7 may be connected to the first control node Q. The seventh transistor T7 may be turned on or turned off according to the voltage of the first control node Q. The seventh transistor T7 may be turned on, when the first control node Q is set as the first level voltage, and may transmit the third carry clock signal CR_CLK3 to the first output terminal OUT1.

The eighth transistor T8 may be connected between the third voltage input terminal V3 and the second node B. A gate of the eighth transistor T8 may be connected to the second control node QB. The eighth transistor T8 may be turned on or turned off according to the voltage of the second control node QB. The eighth transistor T8 may be turned on, when the second control node QB is set as the first level voltage, and may transmit the third voltage VGL22 to the first output terminal OUT1.

The carry signal GW_CR[k] may be output from the first output terminal OUT1 of the first gate logic circuit GLC1. The carry signal GW_CR[k] may be supplied to the input terminal IN of the first gate logic circuit GLC1 of a next stage ST[k+1].

The first gate buffer circuit GBC1 may output a first gate signal GW[k] to the second output terminal OUT2 according to the voltage of the first control node Q and the voltage of the second control node QB. The first gate buffer circuit GBC1 may include a ninth transistor T9 and a tenth transistor T10 which are controlled by different node voltages, e.g., the voltages of first control node Q or second control node QB. The ninth transistor T9 may be a pull-up transistor transmitting the first level voltage (corresponding to clock CLK3) to the second output terminal OUT2. The tenth transistor T10 may be a pull-down transistor transmitting the second level voltage (corresponding to voltage VGL21) to the second output terminal OUT2.

The ninth transistor T9 may be connected between the third clock terminal CK3 and the second output terminal OUT2. A gate of the ninth transistor T9 may be connected to the first control node Q. The ninth transistor T9 may be turned on or turned off according to the voltage of the first control node Q. The ninth transistor T9 may be turned on, when the first control node Q is set as the first level voltage, and may output the third clock signal CLK3 of the first level voltage as the first gate signal GW [K] of the first level voltage or may output the third clock signal CLK3 of the second level voltage as the first gate signal GW[k] of the second level voltage.

The tenth transistor T10 may be connected between the second voltage input terminal V2 and the second output terminal OUT2. A gate of the tenth transistor T10 may be connected to the second control node QB. The tenth transistor T10 may be turned on or turned off according to the voltage of the second control node QB. The tenth transistor T10 may be turned on when the second control node QB is set as the first level voltage, and may output the second voltage VGL21 as the first gate signal GW[k] of the second level voltage.

The first gate signal GW[k] may be output from the second output terminal OUT2 of the first gate buffer circuit GBC1 as a scan signal. The first gate signal GW[k] may correspond to the scan signal GW in FIG. 4. That is, the first gate signal GW[k] may be supplied to the pixel circuit PC (see FIG. 4) through the first gate line GWL (see FIG. 4), which is a scan line connected to the corresponding first gate buffer circuit GBC1.

Referring to FIG. 5B, the kth stage ST[k] of the second scan driving circuit may include a second gate logic circuit GLC2*a* electrically connected to a second gate buffer circuit GBC2*a*. The kth stage ST[k] of the second scan driving circuit may have a structure different from the kth stage ST[k] of the first scan driving circuit. For example, the second gate logic circuit GLC2*a* may be connected to an input terminal IN1, a control signal terminal RS, a first clock terminal CK1, a second clock terminal CK2, a first voltage input terminal V1, a second voltage input terminal V2, a third voltage input terminal V3, and a second output terminal OUT2. The second gate buffer circuit GBC2*a* may be connected to the first voltage input terminal V1, the second voltage input terminal V2, and a first output terminal OUT1. Thus, the second gate logic circuit GLC2*a* and the second gate buffer circuit GBC2*a* may therefore share one or more power supply voltages or signals, which can reduce the complexity of the circuit design. The first output terminal OUT1 outputs the second gate signal GB[k] which may correspond to the gate signal GB in FIG. 4.

A start signal GB_FLM or a carry signal (hereinafter, referred to as a "previous carry signal") output by a previous stage may be input to the input terminal IN1. For example, when k is 1 and thus stage ST[1] is an initial stage, the start signal GB_FLM may be input to the input terminal IN1 of a stage ST[1], and when k is 2 or greater, a carry signal GB_CR[k−1] output from a k−1th stage may be input to the input terminal IN1 of the kth stage ST[k] as a start signal.

A control signal SR_GB may be input to the control signal terminal RS. The control signal SR_GB may be supplied to initialize (reset) the voltages of a first control node Q and a second control node QB of the second gate logic circuit GLC2*a*, when an operation error has occurred in a display apparatus. By supplying the control signal SR_GB of the gate-on voltage during a certain time period, the first control node Q may be set as the second level (low) voltage and the second control node QB may be set as the first level (high) voltage.

A first voltage VGH2 may be input to the first voltage input terminal V1, a second voltage VGL21 may be input to the second voltage input terminal V2, and a third voltage VGL22 may be input to the third voltage input terminal V3. The second voltage VGL21 may have a lower voltage level than the first voltage VGH2. The third voltage VGL22 may have a lower voltage level than the second voltage VGL21. The first voltage VGH2, the second voltage VGL21, and the third voltage VGL22 may be input from the power supply circuit 170 (see FIG. 1).

A first clock signal GB_CLK1, or a second clock signal, may be input to the first clock terminal CK1, and a third clock signal GB_CLK3 or a fourth clock signal may be input to the second clock terminal CK2 and the third clock terminal CK3. For example, when k is an odd number, the first clock signal GB_CLK1 may be input to the first clock terminal CK1 and the third clock signal GB_CLK3 may be input to the second clock terminal CK2 and the third clock terminal CK3. When k is an even number, the second clock signal may be input to the first clock terminal CK1 and the fourth clock signal may be input to the second clock terminal CK2 and the third clock terminal CK3.

The first clock signal GB_CLK1, the second clock signal, the third clock signal GB_CLK3, and the fourth clock signal may be square wave (or pulse) signals having a repeating pattern of high-level voltages and low-level voltages. The first clock signal GB_CLK1, the second clock signal, the third clock signal GB_CLK3, and the fourth clock signal may have substantially the same waveform with shifted phases.

The second gate logic circuit GLC2*a* may control the voltages of the first control node Q, the second control node QB, and a third control node QF in response to signals input to the input terminal IN1, the first clock terminal CK1, the second clock terminal CK2, and the third clock terminal CK3. The second gate logic circuit GLC2*a* may include first to eighth transistors T1_1 and T1_2 to T8_1 and T8_2, eleventh to fifteenth transistors T11 to T15, a first capacitor C1, and a third capacitor C3.

The first transistor T1_1 and T1_2 (which is different from first transistor T1 in the pixel of FIG. 4) may be connected between the input terminal IN1 and the first control node Q. The first transistor T1_1 and T1_2 may include a plurality of sub-transistors that are connected in series. The sub-transistors may include a pair of a first-1 transistor T1_1 and a first-2 transistor T1_2. Gates of the first-1 transistor T1_1 and the first-2 transistor T1_2 may be connected to the first clock terminal CK1. The first-1 transistor T1_1 and the first-2 transistor T1_2 may be turned on when the first clock signal GB_CLK1 of the gate-on voltage is supplied thereto, and may set the voltage of the first control node Q to correspond to the start signal GB_FLM or the voltage of a previous carry signal GB_CR[k−1].

The second transistor T2_1 and T2_2 may be connected between the first voltage input terminal V1 and a first node A. The second transistor T2_1 and T2_2 may include a plurality of sub-transistors that are connected in series. The sub-transistors may include a pair of a second-1 transistor T2_1 and a second-2 transistor T2_2. Gates of the second-1 transistor T2_1 and the second-2 transistor T2_2 may be connected to the first control node Q. The second-1 transistor T2_1 and the second-2 transistor T2_2 may be turned on or turned off according to the voltage of the first control node Q. When the second-1 transistor T2_1 and the second-2 transistor T2_2 are turned on, the first voltage VGH2 from the first voltage input terminal V1 may be transmitted to the first node A, and thus leakage current through the first transistor T1_1 and T1_2, the third transistor T3_1 and T3_2, and the eighth transistor T8_1 and T8_2 that are turned off may be blocked and the voltage level of the first control node Q may be stably maintained.

The third transistor T3_1 and T3_2 may be connected between the third voltage input terminal V3 and the first control node Q. The third transistor T3_1 and T3_2 may include a plurality of sub-transistors that are connected in series. The sub-transistors may include a pair of a third-1 transistor T3_1 and a third-2 transistor T3_2. Gates of the third-1 transistor T3_1 and the third-2 transistor T3_2 may be connected to the second control node QB. The third-1 transistor T3_1 and the third-2 transistor T3_2 may be turned on or turned off according to the voltage of the second control node QB. When the second control node QB is set as the first level (high) voltage, the third-1 transistor T3_1 and the third-2 transistor T3_2 may be turned on and may transmit the third voltage VGL22 to the first control node Q.

The fourth transistor T4 may be connected between the first control node Q and the third control node QF. A gate of the fourth transistor T4 may be connected to the first voltage input terminal V1 to receive the first voltage VGH2. The fifth transistor T5 may be connected between the third clock terminal CK3 and the first capacitor C1, and the first capacitor C1 may be connected between the fifth transistor T5 and the third control node QF. A gate of the fifth transistor T5 may be connected to the third control node QF. In one embodiment, the fifth transistor T5 may be a dual gate transistor. The fifth transistor T5 may be turned on or turned off according to the voltage of the third control node QF. When the fifth transistor T5 is turned on, the voltage of the third control node QF may be changed according to the third clock signal GB_CLK3.

The sixth transistor T6 may be connected between the first voltage input terminal V1 and the second output terminal OUT2. A gate of the sixth transistor T6 may be connected to the third control node QF. The sixth transistor T6 may be turned on or turned off according to the voltage of the third control node QF. The sixth transistor T6 may be turned on when the third control node QF is set as the first level (high) voltage, and may output the first voltage VGH2 as a carry signal GB_CR[k].

The seventh transistor T7 may be connected between the third voltage input terminal V3 and the second output terminal OUT2. A gate of the seventh transistor T7 may be connected to the second control node QB. The seventh transistor T7 may be turned on or turned off according to the voltage of the second control node QB. The seventh transistor T7 may be turned on when the second control node QB is set as the first level (high) voltage, and may output the third voltage VGL22 as the carry signal GB_CR[k].

The eighth transistor T8_1 and T8_2 may be connected between the second voltage input terminal V2 and the first control node Q. A gate of the eighth transistor T8_1 and T8_2 may be connected to the control signal terminal RS and be controlled by control signal SR_GB. For example, the eighth transistor T8_1 and T8_2 may be turned on when the control signal SR_GB having a gate-on voltage is supplied thereto, and may set the first control node Q as the second level voltage and the second control node QB as the first level voltage.

The eleventh transistor T11 may be connected between the third voltage input terminal V3 and the second control node QB. A gate of the eleventh transistor T11 may be connected to the first control node Q. The eleventh transistor T11 may be turned on or turned off according to the voltage of the first control node Q. The eleventh transistor T11 may be turned on when the first control node Q is set as the first level (high) voltage, and may transmit the third voltage VGL22 to the second control node QB.

The twelfth transistor T12_1 and T12_2 may be connected between the first voltage input terminal V1 and a second node B. The twelfth transistor T12_1 and T12_2 may include a plurality of sub-transistors that are connected in series. The sub-transistors may include a pair of a twelfth-1 transistor T12_1 and a twelfth-2 transistor T12_2. Gates of the twelfth-1 transistor T12_1 and the twelfth-2 transistor T12_2 may be connected to the first voltage input terminal V1 and thus may be controlled by the first voltage VGH2.

The thirteenth transistor T13 may be connected between the first voltage input terminal V1 and the fourteenth transistor T14. A gate of the thirteenth transistor T13 may be connected to the second node B. The thirteenth transistor T13 may be turned on or turned off according to the voltage of the second node B. The fourteenth transistor T14 may be connected between the thirteenth transistor T13 and the second control node QB. A gate of the fourteenth transistor T14 may be connected to the second clock terminal CK2. The fourteenth transistor T14 may be turned on or off according to whether the third clock signal GB_CLK3 has the first level voltage. The third capacitor C3 may be connected between the second node B and the second control node QB. The fourteenth transistor 14 may be turned on according to the third clock signal GB_CLK3 having the first level voltage and may transmit the first level voltage to the second control node QB.

The fifteenth transistor T15 may be connected between the second voltage input terminal V2 and the second node B. A gate of the fifteenth transistor T15 may be connected to the first control node Q. The fifteenth transistor T15 may be turned on or turned off according to the voltage of the first control node Q. When the first control node Q is set as the first level (high) voltage, the fifteenth transistor T15 may be turned on and may transmit the second voltage VGL21 to the second node B.

The carry signal GB_CR[k] may be output from the second output terminal OUT2 of the second gate logic circuit GLC2*a*. The carry signal GB_CR[k] may be supplied to the input terminal IN1 of the second gate logic circuit GLC2*a* of a next stage ST[k+1].

The second gate buffer circuit GBC2*a* may output a second gate signal GB[k] to the first output terminal OUT1 according to the voltage of the second control node QB and the voltage of the third control node QF. The second gate buffer circuit GBC2*a* may include a ninth transistor T9, a tenth transistor T10, and a second capacitor C2. The ninth transistor T9 may be a pull-up transistor transmitting the first level voltage to the first output terminal OUT1. The tenth transistor T10 may be a pull-down transistor transmitting the second level voltage to the first output terminal OUT1.

The ninth transistor T9 may be connected between the first voltage input terminal V1 and the first output terminal OUT1. A gate of the ninth transistor T9 may be connected to the third control node QF. The ninth transistor T9 may be turned on or turned off according to the voltage of the third control node QF. The ninth transistor T9 may be turned on when the third control node QF is set as the first level (high) voltage, and may output the first voltage VGH2 as the second gate signal GB[k] of the first level voltage. The second capacitor C2 may be connected between the third control node QF and the first output terminal OUT1.

The tenth transistor T10 may be connected between the second voltage input terminal V2 and the first output terminal OUT1. A gate of the tenth transistor T10 may be connected to the second control node QB. The tenth transistor T10 may be turned on or turned off according to the voltage of the second control node QB. The tenth transistor T10 may be turned on when the second control node QB is set as the first level voltage, and may output the second voltage VGL21 as the second gate signal GB[k] of the second level (low) voltage.

The second gate signal GB[k] may be output from the first output terminal OUT1 of the second gate buffer circuit GBC2*a* as a scan signal. The second gate signal GB[k] may correspond to the gate signal GB in FIG. 4. That is, the second gate signal GB[k] may be supplied to the pixel circuit PC (see FIG. 4) through the second gate line GBL (see FIG. 4), which is the scan line connected to the second gate buffer circuit GBC2*a*.

FIG. 5B illustrates that the second scan driving circuit is a second gate driving circuit outputting the second gate signal GB[k]. According to an embodiment, a third gate driving circuit outputting the third gate signal GR (see FIG. 4) may have a similar structure as the second scan driving circuit.

Referring to FIG. 5C, the kth stage ST[k] of the third scan driving circuit may have a structure different from the kth stage ST[k] of the first scan driving circuit and the second scan driving circuit. For example, the kth stage ST[k] of the third scan driving circuit may include a first emission control logic circuit ELC1 and a first emission control buffer circuit EBC1. The first emission control logic circuit ELC1 may be connected to an input terminal IN1, a control signal terminal RS, a first clock terminal CK1, a second clock terminal CK2, a first voltage input terminal V1, a second voltage input terminal V2, a third voltage input terminal V3, and a second output terminal OUT2. The first emission control buffer circuit EBC1 may be connected to the first voltage input terminal V1, the second voltage input terminal V2, and a first output terminal OUT1. Thus, the first emission control logic circuit ELC1 and the first emission control buffer circuit EBC1 may share one or more power supply voltages or signals, which can reduce the complexity of the circuit design.

A start signal ACL_FLM or a carry signal (hereinafter, referred to as a "previous carry signal") output by a previous stage may be input to the input terminal IN1. For example, when k is 1 and thus stage ST[1] is an initial stage, the start signal ACL_FLM may be input to the input terminal IN1 of a stage ST[1]. When k is 2 or greater, a carry signal EM_CR[k−1] output from a k−1th stage may be input to the input terminal IN1 of the kth stage ST[k] as a start signal.

A control signal ESR may be input to the control signal terminal RS. The control signal ESR may be supplied to initialize (reset) the voltages of a first control node Q and a second control node QB of the first emission control logic circuit ELC1 when an operation error has occurred in a display apparatus. By supplying the control signal ESR of the gate-on voltage during a certain time period, the first control node Q may be set as the second level (low) voltage and the second control node QB may be set as the first level (high) voltage.

A first voltage VGH1 may be input to the first voltage input terminal V1, a second voltage VGL11 may be input to the second voltage input terminal V2, and a third voltage VGL12 may be input to the third voltage input terminal V3. The second voltage VGL11 may have a lower voltage level than the first voltage VGH1. The third voltage VGL12 may have a lower voltage level than the second voltage VGL11. The first voltage VGH1, the second voltage VGL11, and the third voltage VGL12 may be input from the power supply circuit 170 (see FIG. 1).

A first clock signal EM_CLK1, or a second clock signal, may be input to the first clock terminal CK1, and a third clock signal EM_CLK3 or a fourth clock signal may be input to the second clock terminal CK2 and the third clock terminal CK3. For example, when k is an odd number, the first clock signal EM_CLK1 may be input to the first clock terminal CK1 and the third clock signal EM_CLK3 may be input to the second clock terminal CK2 and the third clock terminal CK3. When k is an even number, the second clock signal may be input to the first clock terminal CK1 and the fourth clock signal may be input to the second clock terminal CK2 and the third clock terminal CK3.

The first clock signal EM_CLK1, the second clock signal, the third clock signal EM_CLK3, and the fourth clock signal may be square wave (or pulse) signals having a repeating pattern of high-level voltages and low-level voltages. The first clock signal EM_CLK1, the second clock signal, the third clock signal EM_CLK3, and the fourth clock signal may have substantially the same waveform with shifted phases.

The emission control logic circuit ELC1 may control the voltages of the first control node Q, the second control node QB, and a third control node QF in response to signals input to the input terminal IN1, the first clock terminal CK1, the second clock terminal CK2, and the third clock terminal CK3. The emission control logic circuit ELC1 may include first to eleventh transistors T1_1 and T1_2 to T11, a thirteenth transistor T13, a fifteenth transistor T15, a sixteenth transistor T16, a first capacitor C1, and a second capacitor C2. Some of these transistors may be dual-gate transistors or may have a number of sub-transistors.

The first transistor T1_1 and T1_2 (which is different from first transistor T1 in the pixel of FIG. 4) may be connected between the input terminal IN1 and the first control node Q. The first transistor T1_1 and T1_2 may include a plurality of sub-transistors that are connected in series. The sub-transistors may include a pair of a first-1 transistor T1_1 and a first-2 transistor T1_2. Gates of the first-1 transistor T1-1 and the first-2 transistor T1_2 may be connected to the first clock terminal CK1. The first-1 transistor T1_1 and the first-2 transistor T1_2 may be turned on when the first clock signal EM_CLK1 of the gate-on voltage is supplied thereto, and may set the voltage of the first control node Q as the start signal ACL_FLM or the voltage of a previous carry signal EM_CR[k−1].

The second transistor T2_1 and T2_2 may be connected between the third voltage input terminal V3 and the first control node Q. The second transistor T2_1 and T2_2 may include a plurality of sub-transistors that are connected in series. The sub-transistors may include a pair of a second-1 transistor T2_1 and a second-2 transistor T2_2. Gates of the second-1 transistor T2_1 and the second-2 transistor T2_2 may be connected to the second control node QB. The second-1 transistor T2_1 and the second-2 transistor T2_2 may be turned on or turned off according to the voltage of the second control node QB. When the second control node QB is set as the first level (high) voltage, the second-1 transistor T2_1 and the second-2 transistor T2_2 may be turned on and may transmit the third voltage VGL12 to the first control node Q.

The third transistor T3 may be connected between the first control node Q and the third control node QF. A gate of the third transistor T3 may be connected to the first voltage input terminal V1 and thus is controlled by the first voltage VGH1.

The fourth transistor T4 may be connected between the third voltage input terminal V3 and the second control node QB. A gate of the fourth transistor T4 may be connected to the first control node Q. The fourth transistor T4 may be turned on or turned off according to the voltage of the first control node Q. When the first control node Q is set as the first level (high) voltage, the fourth transistor T4 may be turned on and may transmit the third voltage VGL12 to the second control node QB.

The fifth transistor T5 may be connected between the third clock terminal CK3 and the first capacitor C1, and the first capacitor C1 may be connected between the fifth transistor T5 and the third control node QF. A gate of the fifth transistor T5 may be connected to the third control node QF. The fifth transistor T5 may be turned on or turned off according to the voltage of the third control node QF. When the fifth transistor T5 is turned on, the voltage of the third control node QF may be changed according to the third clock signal EM_CLK3.

The sixth transistor T6 may be connected between the first voltage input terminal V1 and the second output terminal OUT2. A gate of the sixth transistor T6 may be connected to the third control node QF. The sixth transistor T6 may be turned on or turned off according to the voltage of the third control node QF. The sixth transistor T6 may be turned on, when the third control node QF is set as the first level (high) voltage, and may output the first voltage VGH1 as a carry signal EM_CR[k] to a subsequent stage.

The seventh transistor T7 may be connected between the first voltage input terminal V1 and a second node B. A gate of the seventh transistor T7 may be connected to the first clock terminal CK1. The seventh transistor T7 may be turned on when the first clock signal EM_CLK1 of the gate-on voltage is supplied thereto, and may transmit the first voltage VGH1 to the second node B.

The eighth transistor T8_1 and T8_2 may be connected between the first clock terminal CK1 and the second node B. A gate of the eighth transistor T8_1 and T8_2 may be connected to the first control node Q. The eighth transistor T8_1 and T8_2 may be turned on or turned off according to the voltage of the first control node Q. When the first control node Q is set as the first level (high) voltage, the eighth transistor T8_1 and T8_2 may be turned on and may transmit the first clock signal EM_CLK1 to the second node B.

The ninth transistor T9 may be connected between the second node B and a third node C. A gate of the ninth transistor T9 may be connected to the first voltage input terminal V1 and thus may be controlled by the first voltage VGH1.

The tenth transistor T10 may be connected between the second clock terminal CK2 and a fourth node D. A gate of the tenth transistor T10 may be connected to the third node C. The tenth transistor T10 may be turned on or turned off according to the voltage of the third node C. When the third node C is set as the first level (high) voltage, the tenth transistor T10 may be turned on and may transmit the third clock signal EM_CLK3 to the fourth node D. The second capacitor C2 may be connected between the third node C and the fourth node D.

The eleventh transistor T11 may be connected between the first voltage input terminal V1 and the second control node QB. A gate of the eleventh transistor T11 may be connected to the fourth node D. The eleventh transistor T11 may be turned on or turned off according to the voltage of the fourth node D. The eleventh transistor T11 may be turned on according to the first clock signal EM_CLK1 and the third clock signal EM_CLK3 and may transmit the first voltage VGH1 to the second control node QB.

The thirteenth transistor T13 may be connected between the third voltage input terminal V3 and the second output terminal OUT2. A gate of the thirteenth transistor T13 may be connected to the second control node QB. The thirteenth transistor T13 may be turned on when the second control node QB is set as the first level (high) voltage, and may output the third voltage VGL12 as the carry signal EM_CR[k] to a subsequent stage.

The fifteenth transistor T15_1 and T15_2 may be connected between the first voltage input terminal V1 and a first node A. The fifteenth transistor T15_1 and T15_2 may include a plurality of sub-transistors that are connected in series. The sub-transistors may include a pair of a fifteenth-1 transistor T15_1 and a fifteenth-2 transistor T15_2. Gates of the fifteenth-1 transistor T15_1 and the fifteenth-2 transistor T15_2 may be connected to the first control node Q. The fifteenth-1 transistor T5_1 and the fifteenth-2 transistor T15_2 may be turned on or turned off according to the voltage of the first control node Q. When the fifteenth-1 transistor T15_1 and the fifteenth-2 transistor T15_2 are turned on by a high voltage of the first control node Q, the first voltage VGH1 may be transmitted to the first node A, and thus leakage current through the first transistor T1_1 and T1_2, the second transistor T2_1 and T2_2, and the sixteenth transistor T16_1 and T16_2 that are turned off may be blocked and the voltage level of the first control node Q may be stably maintained.

The sixteenth transistor T16_1 and T16_2 may be connected between the second voltage input terminal V2 and the first control node Q. The sixteenth transistor T16_1 and T16_2 may include a plurality of sub-transistors that are connected in series. The sub-transistors may include a pair of a sixteenth-1 transistor T16_1 and a sixteenth-2 transistor T16_2. Gates of the sixteenth-1 transistor T16_1 and the sixteenth-2 transistor T16_2 may be connected to the control signal terminal RS and thus may be controlled by control signal ESR. The sixteenth transistor T16_1 and T16_2 may be turned on when the control signal ESR is supplied thereto, and may set the first control node Q as the second level (low) voltage.

The carry signal EM_CR[k] may be output from the second output terminal OUT2 of the first emission control logic circuit ELC1. The carry signal EM_CR[k] may be supplied to the input terminal IN1 of the first emission control logic circuit ELC1 of a next stage ST[k+1].

The first emission control buffer circuit EBC1 may output a first emission control signal EM[k] to the first output terminal OUT1 according to the voltage of the second control node QB and the voltage of the third control node QF. The first emission control buffer circuit EBC1 may include a twelfth transistor T12, a fourteenth transistor T14, a third capacitor C3, and a fourth capacitor C4. The twelfth transistor T12 may be a pull-up transistor transmitting the first level (high) voltage to the first output terminal OUT1. The fourteenth transistor T14 may be a pull-down transistor transmitting the second level (low) voltage to the first output terminal OUT1.

The twelfth transistor T12 may be connected between the first voltage input terminal V1 and the first output terminal OUT1. A gate of the twelfth transistor T12 may be connected to the third control node QF. The twelfth transistor T12 may be turned on or turned off according to the voltage of the third control node QF. The twelfth transistor T12 may be turned on when the third control node QF is set as the first level (high) voltage, and may output the first voltage VGH1 as the first emission control signal EM[k] of the first level voltage. For example, the first emission control signal EM[k] may correspond to emission control signal EM in FIG. 4. The third capacitor C3 may be connected between the third control node QF and the first output terminal OUT1.

The fourteenth transistor T14 may be connected between the second voltage input terminal V2 and the first output terminal OUT1. A gate of the fourteenth transistor T14 may be connected to the second control node QB. The fourteenth transistor T14 may be turned on or turned off according to the voltage of the second control node QB. The fourteenth transistor T14 may be turned on when the second control node QB is set as the first level (high) voltage, and may output the second voltage VGL11 as the first emission control signal EM[k] of the second level voltage. The fourth capacitor C4 may be connected between the second voltage input terminal V2 and the second control node QB.

The first emission control signal EM[k] may be output from the first output terminal OUT1 of the first emission control buffer circuit EBC1 as a scan signal. The first emission control signal EM[k] may correspond to emission control signal EM in FIG. 4. That is, the first emission control signal EM [K] may be supplied to the pixel circuit PC (see FIG. 4) through the first emission control line EML (see FIG. 4), which is the scan line connected to the first emission control buffer circuit EBC1.

FIG. 5C illustrates that the third scan driving circuit is a first emission control driving circuit outputting the first emission control signal EM[k]. According to an embodiment, a second emission control driving circuit outputting a second emission control signal EMB may have a similar structure as the third scan driving circuit.

The stage ST[k] of each of the first to third scan driving circuits illustrated in FIGS. 5A, 5B, and 5C, respectively, is only an example. The stage ST[k] may be variously designed by, for example, omitting or adding some of the transistors and the capacitors. In addition, some or all of the transistors in stage ST[k] of each of the first to third scan driving circuits may be PMOS transistors.

Figure 6:
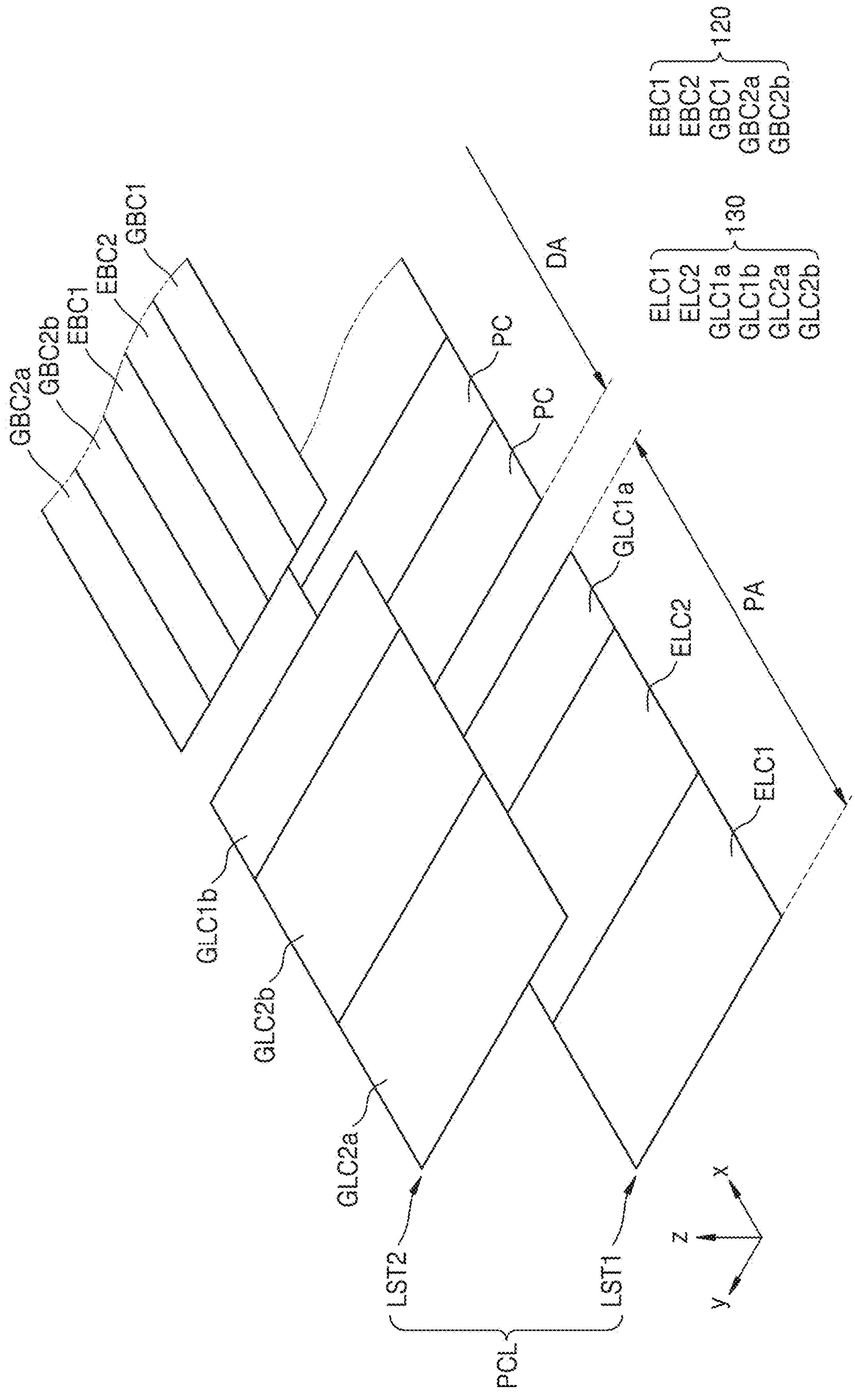
FIG. 6 is a schematic diagram of a first layer stack and a second layer stack according to an embodiment.

FIG. 6 is a schematic view of the first layer stack LST1 and the second layer stack LST2 (e.g., see FIG. 3) according to an embodiment.

Referring to FIG. 6, the plurality of pixel circuits PC and the buffer circuit unit 120 on the pixel circuits PC may be arranged in the display area DA. This allows the size of the peripheral area PA to be reduced. The buffer circuit unit 120 may include a plurality of buffer circuits, for example, the first emission control buffer circuit EBC1, a second emission control buffer circuit EBC2, the first gate buffer circuit GBC1, the second gate buffer circuit GBC2*a*, and a third gate buffer circuit GBC2*b*.

The logic circuit unit 130 may be arranged in the peripheral area PA. The logic circuit unit 130 may include a plurality of logic circuits, for example, the first emission control logic circuit ELC1, a second emission control logic circuit ELC2, a first-1 gate logic circuit GLC1*a*, a first-2 gate logic circuit GLC1*b*, the second gate logic circuit GLC2*a*, and a third gate logic circuit GLC2*b*. Each of the first-1 gate logic circuit GLC1*a* and the first-2 gate logic circuit GLC1*b* may be a portion of the first gate logic circuit GLC1 described with reference to FIG. 5A. Some of the gate logic circuits may be formed on other gate logic circuits and/or emission control logic circuits to reduce the size of the peripheral area PA.

For example, the first-1 gate logic circuit GLC1*a* and the first-2 gate logic circuit GLC1*b* may be electrically connected to each other and may be configured to output the first gate signal GW through the first gate buffer circuit GBC1. In the example of FIG. 6, the first-2 gate logic circuit GLC1*b* may be formed on the first-1 gate logic circuit GLC1*a* in the peripheral area PA. The second gate logic circuit GLC2*a* and the second gate buffer circuit GBC2*a* may be connected to each other and may form a stage of the second gate driving circuit outputting the second gate signal GB (see FIG. 4). The third gate logic circuit GLC2*b* and the third gate buffer circuit GBC2*b* may be connected to each other and may form a stage of the third gate driving circuit outputting the third gate signal GR (see FIG. 4). The first emission control logic circuit ELC1 and the first emission control buffer circuit EBC1 may be connected to each other and may form a stage of the first emission control driving circuit outputting the first emission control signal EM (see FIG. 4). The second emission control logic circuit ELC2 and the second emission control buffer circuit EBC2 may be connected to each other and may form a stage of the second emission control driving circuit outputting the second emission control signal EMB (see FIG. 4).

The pixel circuit layer PCL may include the first layer stack LST1 and the second layer stack LST2. The second layer stack LST2 may be arranged on the first layer stack LST1. The first layer stack LST1 may include the first emission control logic circuit ELC1, the second emission control logic circuit ELC2, and the first-1 gate logic circuit GLC1*a* which are arranged in the peripheral area PA and may include the plurality of pixel circuits PC arranged in the display area DA. The pixel circuits PC may have a structure corresponding, for example, to FIGS. 3 and 4.

The second layer stack LST2 may include the first-2 gate logic circuit GLC1*b*, the second gate logic circuit GLC2*a*, and the third gate logic circuit GLC2*b* which are arranged in the peripheral area PA and may include the first gate buffer circuit GBC1, the second gate buffer circuit GBC2*a*, the third gate buffer circuit GBC2*b*, the first emission control buffer circuit EBC1, and the second emission control buffer circuit EBC2 which are arranged in the display area DA.

The first-2 gate logic circuit GLC1*b*, the second gate logic circuit GLC2*a*, and the third gate logic circuit GLC2*b* may be arranged on the first-1 gate logic circuit GLC1*a*, the first emission control logic circuit ELC1, and the second emission control logic circuit ELC2, respectively. The first gate buffer circuit GBC1, the second gate buffer circuit GBC2*a*, the third gate buffer circuit GBC2*b*, the first emission control buffer circuit EBC1, and the second emission control buffer circuit EBC2 may be arranged on the pixel circuits PC, and, for example, between the pixel circuits PC and a plurality of light-emitting diodes ED.

FIG. 6 illustrates that the first emission control logic circuit ELC1 and the second emission control logic circuit ELC2 may be arranged in the first layer stack LST1 of the peripheral area PA, and the second gate logic circuit GLC2*a* and the third gate logic circuit GLC2*b* may be arranged in the second layer stack LST2 of the peripheral area PA. However, the disclosure is not limited thereto. According to an embodiment, the first emission control logic circuit ELC1 and the second gate logic circuit GLC2*a* may be arranged in the first layer stack LST1, and the second emission control logic circuit ELC2 and the third gate logic circuit GLC2*b* may be arranged in the second layer stack LST2. Like this, designs of the arrangement of the logic circuits may be variously changed.

According to an embodiment, each of the first gate buffer circuit GBC1, the second gate buffer circuit GBC2*a*, the third gate buffer circuit GBC2*b*, the first emission control buffer circuit EBC1, and the second emission control buffer circuit EBC2 may extend in a first direction (an x direction or a row direction). The first gate buffer circuit GBC1, the second emission control buffer circuit EBC2, the first emission control buffer circuit EBC1, the third gate buffer circuit GBC2*b*, and the second gate buffer circuit GBC2*a* may be sequentially and repeatedly arranged in a second direction (a y direction or a column direction). The arrangement order of the first gate buffer circuit GBC1, the second gate buffer circuit GBC2*a*, the third gate buffer circuit GBC2*b*, the first emission control buffer circuit EBC1, and the second emission control buffer circuit EBC2 may vary among embodiments.

Figure 7:
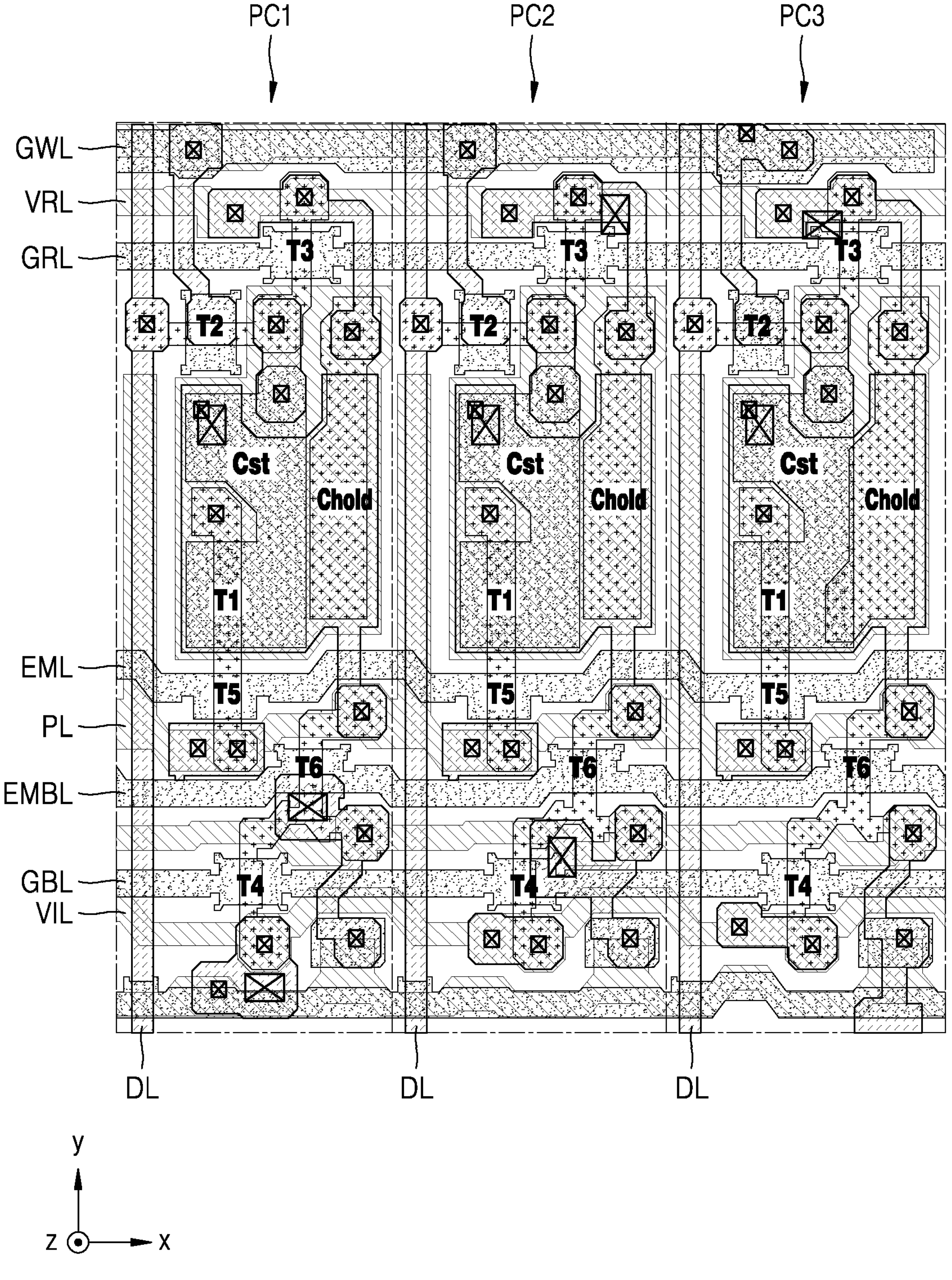
FIG. 7 is a schematic layout diagram of pixel circuits according to an embodiment.
Figure 8:
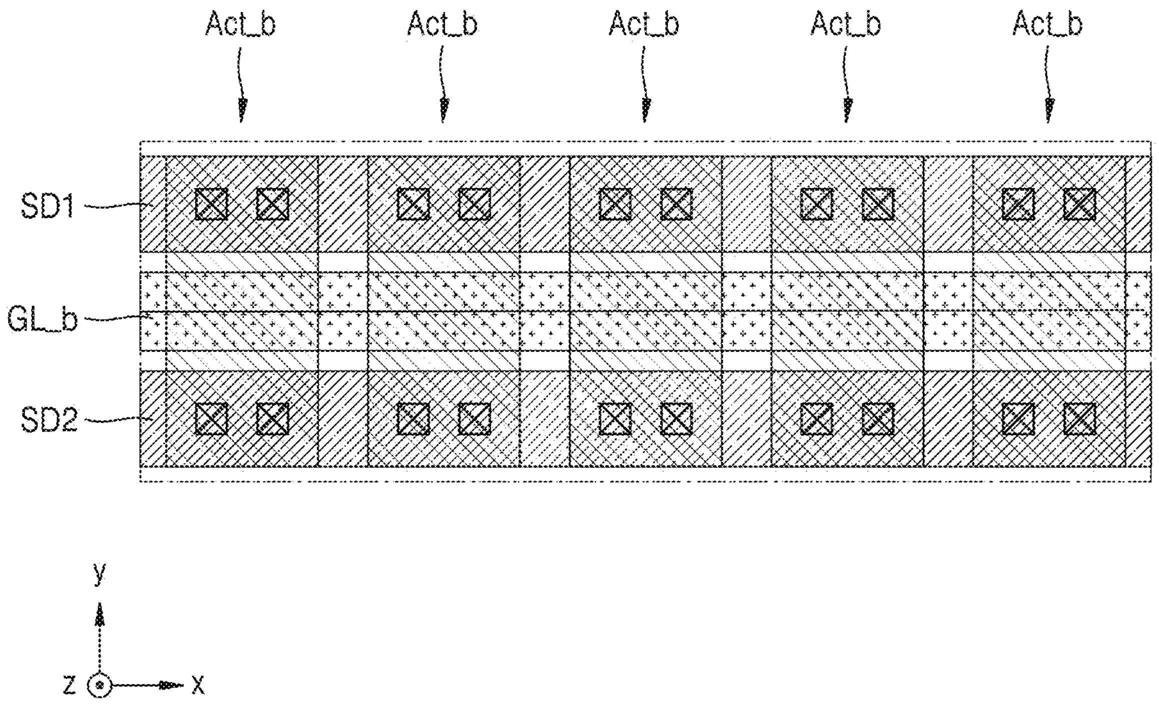
FIG. 8 is a schematic layout diagram of a portion of a buffer transistor according to an embodiment.

FIG. 7 is a schematic layout diagram of pixel circuits PC according to an embodiment, and FIG. 8 is a schematic layout diagram of a portion of a buffer transistor according to an embodiment. Each the pixel circuits PC may have a structure shown, for example, in FIG. 4.

Referring to FIGS. 4 and 7 together, a first pixel circuit PC1, a second pixel circuit PC2, and a third pixel circuit PC3 may be sequentially arranged in a first direction (an x direction). The first pixel circuit PC1, a second pixel circuit PC2, and a third pixel circuit PC3 may emit light of different colors and thus may be sub-pixels that form a unit pixel. In other embodiments, the first pixel circuit PC1, a second pixel circuit PC2, and a third pixel circuit PC3 may not form a unit pixel, e.g,. may be included in different unit pixels.

Each of the first pixel circuit PC1, the second pixel circuit PC2, and the third pixel circuit PC3 may include first to sixth transistors T1 to T6, a storage capacitor Cst, and a hold capacitor Chold. Hereinafter, each of elements will be described based on the first pixel circuit PC1.

The first pixel circuit PC1 may be connected to voltage lines, scan lines, and a data line DL. The voltage lines may include an initialization voltage line VIL, a reference voltage line VRL, and a driving voltage line PL. The initialization voltage line VIL may transmit a diode initialization voltage Vaint to the fourth transistor T4. The reference voltage line VRL may transmit a reference voltage VREF to the third transistor T3. The driving voltage line PL may transmit a driving voltage ELVDD to the fifth transistor T5. The data line DL may transmit a data signal Dm to the second transistor T2.

The scan lines may extend in the first direction (the x direction) and may transmit a scan signal to the first to third pixel circuits PC1 to PC3 in the same row. The scan lines may include the first gate line GWL, the second gate line GBL, the third gate line GRL, the first emission control line EML, and the second emission control line EMBL.

The first gate line GWL may be connected to a gate electrode of the second transistor T2 and may transmit the first gate signal GW to the gate electrode of the second transistor T2. The second gate line GBL may be connected to a gate electrode of the fourth transistor T4 and may transmit the second gate signal GB to the gate electrode of the fourth transistor T4. The third gate line GRL may be connected to a gate electrode of the third transistor T3 and may transmit the third gate signal GR to the gate electrode of the third transistor T3. The first emission control line EML may be connected to a gate electrode of the fifth transistor T5 and may transmit the first emission control signal EM to the gate electrode of the fifth transistor T5. In one embodiment, the first emission control signal EM may correspond to signal EM[k] provided from the first output terminal OUT1 in FIG. 5C. The second emission control line EMBL may be connected to a gate electrode of the sixth transistor T6 and may transmit the second emission control signal EMB to the gate electrode of the sixth transistor T6.

Referring to FIGS. 4, 7, and 8 together, the buffer transistor may include a plurality of buffer semiconductor patterns Act_b, a first source-drain line SD1, a second source-drain line SD2, and a buffer gate line GL_b. The buffer transistor illustrated in FIG. 8 may correspond to the first buffer portion thin-film transistor TFTb1 or the second buffer potion thin-film transistor TFTb2 illustrated in FIG. 3.

Each of the buffer semiconductor patterns Act_b may be included in the second semiconductor layer 2200 (see FIG. 3). Each of the buffer semiconductor patterns Act_b may be arranged to be apart from each other in the first direction (the x direction). Each of the buffer semiconductor patterns Act_b may include a first end and a second end arranged to face each other in a second direction (a y direction).

The first source-drain line SD1 and the second source-drain line SD2 may extend in the first direction (the x direction). According to an embodiment, the first source-drain line SD1 and the second source-drain line SD2 may be included in the sixth metal layer 2400 (see FIG. 3). The first end of each of the buffer semiconductor patterns Act_b may be connected to the first source-drain line SD1, and the second end of each of the buffer semiconductor patterns Act_b may be connected to the second source-drain line SD2.

The first source-drain line SD1 may be connected to a voltage input terminal or a clock terminal. For example, when the buffer transistor illustrated in FIG. 8 is a portion of the pull-up transistor of the first gate buffer circuit GBC1 (see FIG. 5A), the first source-drain line SD1 may be connected to the third clock terminal CK3 (see FIG. 5A) and may receive the third clock signal CLK3 (see FIG. 5A). Alternatively, when the buffer transistor illustrated in FIG. 8 is a portion of the pull-down transistor of the first gate buffer circuit GBC1 (see FIG. 5A), the first source-drain line SD1 may be connected to the second voltage input terminal V2 (see FIG. 5A) and may receive the second (low) voltage VGL21 (see FIG. 5A).

The second source-drain line SD2 may be connected to one of the scan lines. For example, when the buffer transistor illustrated in FIG. 8 is the pull-up transistor or the pull-down transistor of the first gate buffer circuit GBC1, the second source-drain line SD2 may be connected to the first gate line GWL therebelow through a contact metal passing through insulating layers and may output the first gate signal GW to the first gate line GWL to control switching transistor T2 to initialize node N1. When the buffer transistor illustrated in FIG. 8 is the pull-up transistor or the pull-down transistor of the second gate buffer circuit GBC2*a*, the second source-drain line SD2 may be connected to the second gate line GBL therebelow through a contact metal passing through insulating layers and may output the second gate signal GB to the second gate line GB to control switching transistor T4 to perform an initialization operation of the anode of the light-emitting diode ED.

The buffer gate line GL_b may extend in the first direction (the x direction) and may overlap the plurality of buffer semiconductor patterns Act_b. The buffer gate line GL_b may be included in the fifth metal layer 2300. The buffer gate line GL_b may be connected to a control node of a corresponding logic circuit. For example, when the buffer transistor illustrated in FIG. 8 is a portion of the pull-up transistor of the first gate buffer circuit GBC1, the buffer gate line GL_b may be connected to the first control node Q (see FIG. 5A) of the first gate logic circuit GLC1 through a connection line, etc, to control output of clock signal CLK3 through output terminal OUT2. When the buffer transistor illustrated in FIG. 8 is a portion of the pull-down transistor of the first gate buffer circuit GBC1, the buffer gate line GL_b may be connected to the second control node QB (see FIG. 5A) of the first gate logic circuit GLC1 through a connection line, etc., to control the output terminal OUT2 to correspond to the second voltage VGL21.

Figure 9:
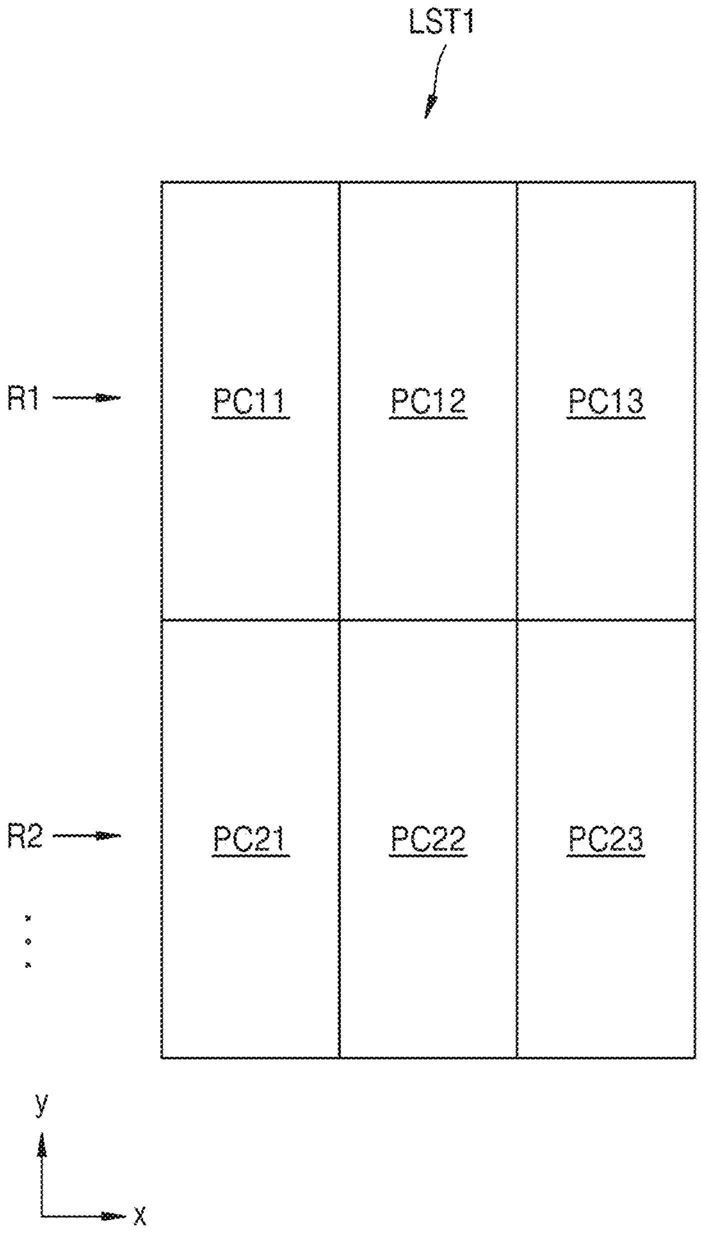
FIG. 9 is a schematic view of a first layer stack according to an embodiment.
Figure 10A:
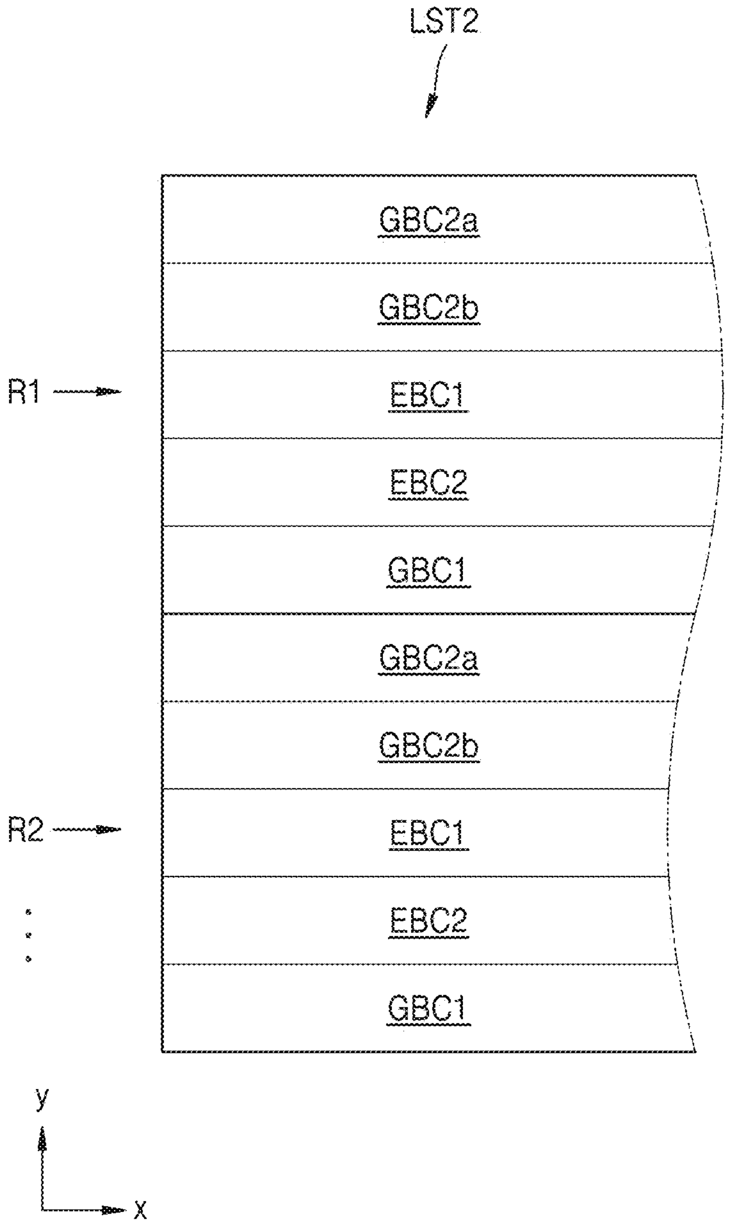
FIGS. 10A and 10B are each a schematic view of a second layer stack according to an embodiment.
Figure 10B:
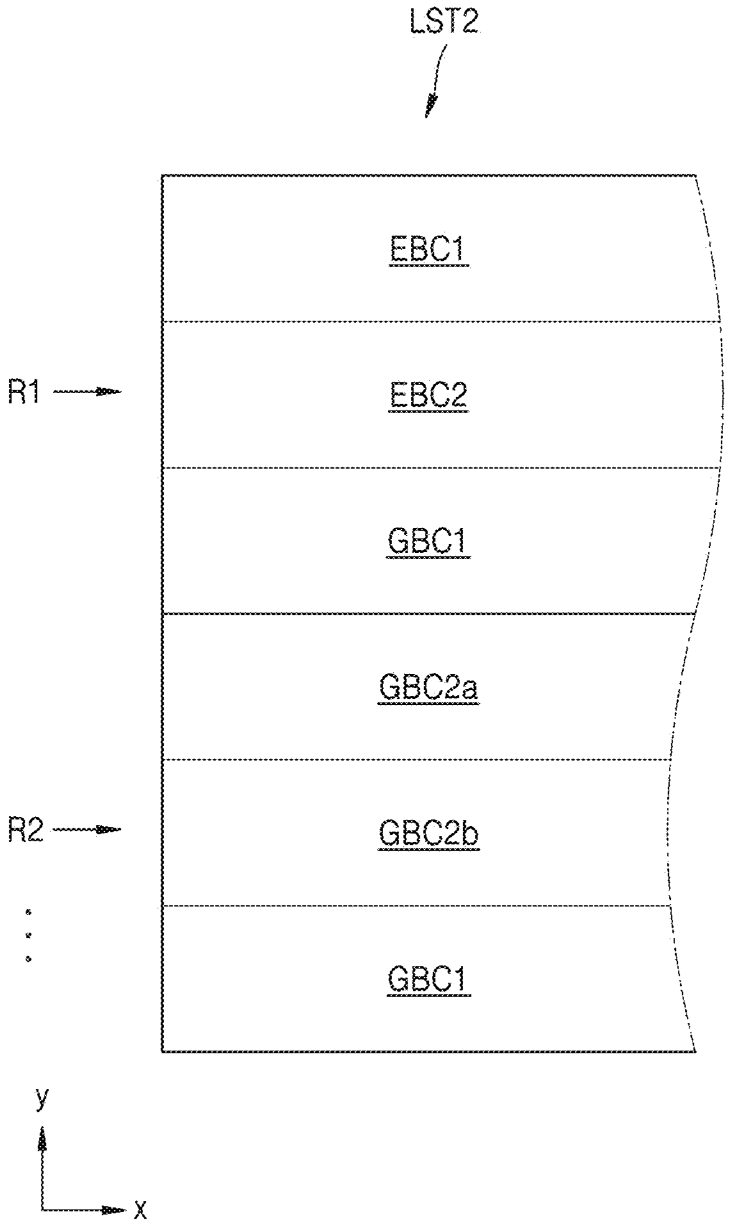

FIG. 9 is a schematic view of the first layer stack LST1 of FIG. 3 according to an embodiment, and each of FIGS. 10A and 10B is a schematic view of the second layer stack LST2 of FIG. 3 according to an embodiment.

Referring to FIG. 9, the first layer stack LST1 may include a plurality of pixel circuits PCij arranged in the display area DA (see FIG. 2). The plurality of pixel circuits PCij may be arranged to form a matrix in a first direction (x direction) and a second direction (y direction). For example, the plurality of pixel circuits PCij may form a plurality of pixel circuit rows R1, R2, . . . , etc.

Referring to FIGS. 10A and 10B, the second layer stack LST2 may include a plurality of buffer circuits arranged in the display area DA (see FIG. 2). The plurality of buffer circuits may include the second gate buffer circuit GBC2*a*, the third gate buffer circuit GBC2*b*, the first emission control buffer circuit EBC1, the second emission control buffer circuit EBC2, and the first gate buffer circuit GBC1. Each of the second gate buffer circuit GBC2*a*, the third gate buffer circuit GBC2*b*, the first emission control buffer circuit EBC1, the second emission control buffer circuit EBC2, and the first gate buffer circuit GBC1 may extend in a first direction (x direction).

The first gate buffer circuit GBC1, the second gate buffer circuit GBC2*a*, the third gate buffer circuit GBC2*b*, the first emission control buffer circuit EBC1, and the second emission control buffer circuit EBC2 may be formed between the second emission control buffer circuit EBC2 and the first gate buffer circuit GBC1 and, in one embodiment, may be repeatedly arranged in a second direction (y direction) according to a predetermined order.

According to an embodiment, as illustrated in FIG. 10A, the second gate buffer circuit GBC2*a*, the third gate buffer circuit GBC2*b*, the first emission control buffer circuit EBC1, the second emission control buffer circuit EBC2, and the first gate buffer circuit GBC1 may be repeatedly arranged for each pixel circuit row. Here, that the buffer circuits may be arranged in any one pixel circuit row may denote that the buffer circuits may be arranged above the pixel circuits included in the one pixel circuit row to overlap the pixel circuits in a plan view. For example, each of the second gate buffer circuit GBC2*a*, the third gate buffer circuit GBC2*b*, the first emission control buffer circuit EBC1, the second emission control buffer circuit EBC2, and the first gate buffer circuit GBC1 arranged in the first pixel circuit row R1 may overlap the pixel circuits PC11, PC12, PC13, . . . , etc., included in the first pixel circuit row R1 in a plan view. Each of the second gate buffer circuit GBC2*a*, the third gate buffer circuit GBC2*b*, the first emission control buffer circuit EBC1, the second emission control buffer circuit EBC2, and the first gate buffer circuit GBC1 arranged in a second pixel circuit row R2 may overlap the pixel circuits PC21, PC22, PC23, . . . , etc., included in the second pixel circuit row R2 in a plan view.

According to another embodiment illustrated in FIG. 10B, each of the first emission control buffer circuit EBC1, the second emission control buffer circuit EBC2, the second gate buffer circuit GBC2*a*, and the third gate buffer circuit GBC2*b* may be arranged for every two pixel circuit rows. For example, the first emission control buffer circuit EBC1 and the second emission control buffer circuit EBC2 may be arranged to overlap an odd-numbered pixel circuit row R1, and the second gate buffer circuit GBC2*a* and the third gate buffer circuit GBC2*b* may be arranged to overlap an even-numbered pixel circuit row R2. Alternatively, the first emission control buffer circuit EBC1 and the second gate buffer circuit GBC2*a* may be arranged to overlap the odd-numbered pixel circuit row R1, and the second emission control buffer circuit EBC2 and the third gate buffer circuit GBC2*b* may be arranged to overlap the even-numbered pixel circuit row R2. Herein, one first gate buffer circuit GBC1 may be arranged for each pixel circuit row.

Figure 11:
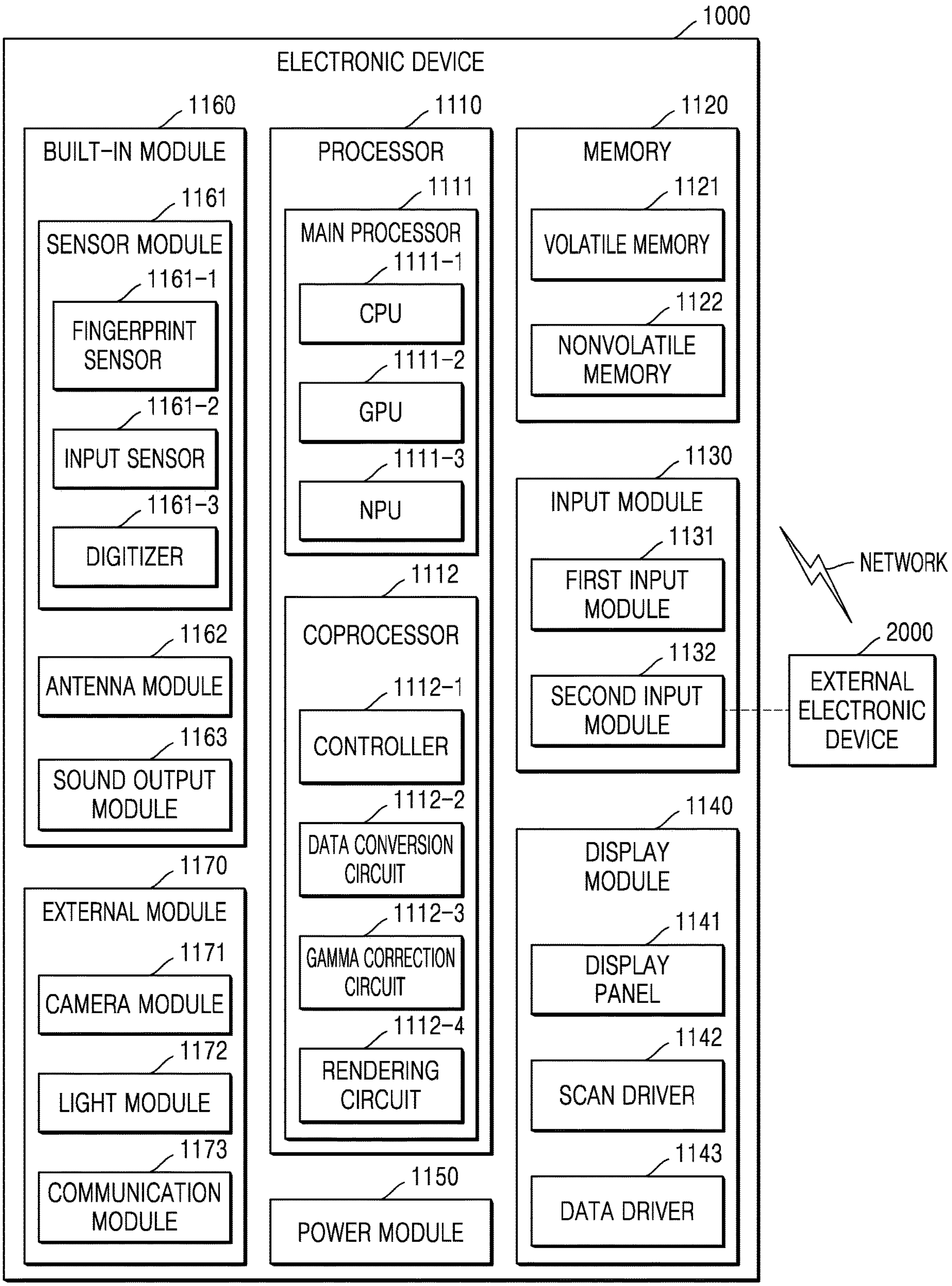
FIG. 11 is a block diagram illustrating an electronic device according to an embodiment.

FIG. 11 is an embodiment of an electronic device 1000 which may include any of the embodiments of the display apparatus described herein. The electronic device 1000 may be a portable electronic device, such as a mobile phone, a smartphone, a tablet personal computer (PC), a mobile communication terminal, an electronic notebook, an electronic book, a portable multimedia player (PMP), a navigation device, and an ultra-mobile PC (UMPC). The electronic device 1000 may also be one of various products, such as a television (TV), a notebook computer, a monitor, a signboard, the Internet of things (IoT) device, etc. Also, the display apparatus according to an embodiment may be used for wearable devices, such as a smart watch, a watch phone, a glasses-type display, and a head-mounted display (HMD). Also, the display apparatus according to an embodiment may be used as a center information display (CID) on a gauge of a vehicle or a center fascia or a dashboard of the vehicle; a room mirror display substituting a side-view mirror of a vehicle; or a display disposed on a rear surface of a front seat, as an entertainment device for a backseat of a vehicle.

Referring to FIG. 11, an electronic device 1000 according to one embodiment of the present invention may output various information through a display module 1140. When a processor 1110 executes an application stored in a memory 1120, the display module 1140 may provide application information to a user through a display panel 1141.

The processor 1110 may acquire an external input through an input module 1130 or a sensor module 1161 and execute an application corresponding to the external input. For example, when a user selects a camera icon (or a camera application icon) displayed on the display panel 1141, the processor 1110 may acquire a user input through an input sensor 1161-2 and activate a camera module 1171. The processor 1110 may transmit image data corresponding to a captured image acquired through the camera module 1171 to the display module 1140. The display module 1140 may display an image corresponding to the captured image through the display panel 1141.

As another example, when personal information authentication is executed in the display module 1140, a fingerprint sensor 1161-1 may acquire input fingerprint information as input data. The processor 1110 may compare the input data acquired through the fingerprint sensor 1161-1 with authentication data stored in the memory 1120, and execute an application based on the comparison result. The display module 1140 may display information executed according to the logic of the application through the display panel 1141. The fingerprint sensor 1161-1 may be disposed to acquire fingerprint information from an entire area of the display module 1140 (or the display panel 1141).

As still another example, when a music streaming icon displayed on the display module 1140 is selected, the processor 1110 may acquire a user input through the input sensor 1161-2 and activate a music streaming application stored in the memory 1120. When a music execution command is input in the music streaming application, the processor 1110 may activate a sound output module 1163 to provide the user with audio information corresponding to the music execution command.

In the above, the operation of the electronic device 1000 is briefly described. Below, the configuration of the electronic device 1000 is described in detail. Some of components of the electronic device 1000 described below may be integrated and provided as one component, and one component may be provided by being divided into two or more components.

The electronic device 1000 may communicate with an external electronic device 2000 via a network (for example, a short-range wireless communication network or a long-range wireless communication network). According to one embodiment, the electronic device 1000 may include the processor 1110, the memory 1120, the input module 1130, the display module 1140, a power module 1150, a built-in module 1160, and an external module 1170. According to one embodiment, in the electronic device 1000, at least one of the above-described components may be omitted, or one or more other components may be added. According to one embodiment, some of the above-described components (for example, the sensor module 1161, an antenna module 1162, or the sound output module 1163) may be integrated into another component (for example, the display module 1140).

The processor 1110 may execute software to control at least one other component (for example, a hardware or software component) of the electronic device 1000 connected to the processor 1110 and perform various data processing or calculations. According to one embodiment, as at least part of data processing or calculations, the processor 1110 may store commands or data received from another component (for example, the input module 1130, the sensor module 1161, or a communication module 1173) in a volatile memory 1121, process the commands or data stored in the volatile memory 1121, and store resulting data in a non-volatile memory 1122.

The processor 1110 may include a main processor 1111 and a coprocessor 1112. The main processor 1111 may include a central processing unit (CPU) 1111-1. The main processor 1111 may further include one or more of a graphics processing unit (GPU) 1111-2, a communication processor (CP), and an image signal processor (ISP). The main processor 1111 may further include a neural network processing unit (NPU) 1111-3. The neural network processing unit 1111-3 may be a processor specialized in processing artificial intelligence models, and the artificial intelligence models may be generated through machine learning. The artificial intelligence models may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, and a combination of two or more of the above, but the present invention is not limited to the examples described above. In addition to the hardware structure, the artificial intelligence models may additionally or alternatively include a software structure. At least two of the processing units and processors described above may be implemented as a single integrated component (for example, a single chip), or each may be implemented as an independent component (for example, a plurality of chips).

The coprocessor 1112 may include a controller 1112-1. The controller 1112-1 may include an interface conversion circuit and a timing control circuit. As an example, the controller 1112-1 may include the timing controller 190 shown in FIG. 1. The controller 1112-1 may receive an image signal from the main processor 1111, convert the data format of the image signal to match the interface specifications with the display module 1140, and output image data. The controller 1112-1 may output various control signals required to drive the display module 1140.

The coprocessor 1112 may further include a data conversion circuit 1112-2, a gamma correction circuit 1112-3, a rendering circuit 1112-4, and the like. The data conversion circuit 1112-2 may receive the image data from the controller 1112-1 and may compensate for the image data so that an image is displayed at a desired luminance according to the characteristics of the electronic device 1000 or the user's settings, or convert the image data to reduce power consumption or compensate for afterimages.

The gamma correction circuit 1112-3 may convert the image data, a gamma reference voltage, or the like so that the image displayed on the electronic device 1000 has the desired gamma characteristics. The rendering circuit 1112-4 may receive the image data from the controller 1112-1 and render the image data by considering the pixel layout of the display panel 1141 applied to the electronic device 1000.

At least one of the data conversion circuit 1112-2, the gamma correction circuit 1112-3, and the rendering circuit 1112-4 may be integrated into another component (for example, the main processor 1111 or the controller 1112-1). At least one of the data conversion circuit 1112-2, the gamma correction circuit 1112-3, and the rendering circuit 1112-4 may also be integrated into a data driver 1143 described below.

The memory 1120 may store various data used by at least one component (for example, the processor 1110 or the sensor module 1161) of the electronic device 1000 and input data or output data for commands related thereto. In addition, various setting data corresponding to the user's settings may be stored in the memory 1120. The memory 1120 may include at least one of the volatile memory 1121 and the non-volatile memory 1122.

The input module 1130 may receive commands or data to be used in components of the electronic device 1000 (for example, the processor 1110, the sensor module 1161, or the sound output module 1163) from outside (for example, the user or the external electronic device 2000) the electronic device 1000.

The input module 1130 may include a first input module 1131 into which commands or data are input from the user, and a second input module 1132 into which commands or data are input from the external electronic device 2000. The first input module 1131 may include a microphone, a mouse, a keyboard, a key (for example, a button), or a pen (for example, a passive pen or an active pen). The second input module 1132 may support a designated protocol that can be connected to the external electronic device 2000 via wired or wireless means. According to one embodiment, the second input module 1132 may include a high definition multimedia interface (HDMI), a universal serial bus (USB) interface, an SD card interface, or an audio interface. The second input module 1132 may include a connector that can be physically connected to the external electronic device 2000, for example, an HDMI connector, a USB connector, an SD card connector, or an audio connector (for example, a headphone connector).

The display module 1140 may provide visual information to the user. The display module 1140 may include the display panel 1141, a scan driver 1142, the data driver 1143, and a voltage generation circuit 1144. The display module 1140 may further include a window, a chassis, and a bracket to protect the display panel 1141. The display module 1140 may include at least a part of the configuration of the display apparatus 10 shown in FIG. 1.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display unit 110 shown in FIG. 1. That is, the display panel 1141 may include the pixel PX shown in FIG. 1, and the pixel PX may include the pixel circuit and the light emitting element.

The scan driver 1142 may be mounted on the display panel 1141 as a driving chip. In addition, the scan driver 1142 may be integrated into the display panel 1141. For example, the scan driver 1142 may include an ASG (Amorphous Silicon TFT Gate) driver circuit, an LTPS (Low Temperature Polycrystalline Silicon) TFT Gate driver circuit, or an OSG (Oxide Semiconductor TFT Gate) driver circuit embedded in the display panel 1141. The scan driver 1142 may receive a control signal from the controller 1112-1 and output scan signals to the display panel 1141 in response to the control signal. The scan driver 1142 may include the scan driving circuits (e.g., the buffer circuit unit 120, and the logic circuit unit 130 shown in FIG. 1).

The data driver 1143 may receive a control signal from the controller 1112-1, convert the image data into an analog voltage (for example, a data signal) in response to the control signal, and then output data signals to the display panel 1141. The data driver 1143 may include the data driving circuit 150 shown in FIG. 1.

The data driver 1143 may be integrated into another component (for example, the controller 1112-1). The functions of the interface conversion circuit and the timing control circuit of the controller 1112-1 described above may also be integrated into the data driver 1143.

In one embodiment, the data driver 1143 may convert data corresponding to red (R), green (G), and blue (B) included in the image data received from the processor 1110 into a red data signal (or data voltage), a green data signal, and a blue data signal, and provide them to a plurality of pixel rows included in the display panel 1141 during one horizontal period.

The power module 1150 may supply power to the components of the electronic device 1000. The power module 1150 may include a battery that charges the power source voltage. The battery may include a non-rechargeable primary battery or a rechargeable secondary battery or fuel cell. The power module 1150 may include a power management integrated circuit (PMIC). The PMIC may supply optimized power source to each of the modules described above and the modules described below. The power module 1150 may include a wireless power transceiver member electrically connected to the battery. The wireless power transceiver member may include a plurality of coil-shaped antenna radiators.

The electronic device 1000 may further include a built-in module 1160 and an external module 1170. The built-in module 1160 may include the sensor module 1161, the antenna module 1162, and the sound output module 1163. The external module 1170 may include the camera module 1171, a light module 1172, and the communication module 1173.

The sensor module 1161 may detect an input by a user's body or an input by the pen of the first input module 1131, and generate an electric signal or data value corresponding to the input. The sensor module 1161 may include at least one of the fingerprint sensor 1161-1, the input sensor 1161-2, and a digitizer 1161-3.

The fingerprint sensor 1161-1 may generate a data value corresponding to a user's fingerprint.

The input sensor 1161-2 may generate a data value corresponding to coordinate information of the input by the user's body or the input by the pen. The input sensor 1161-2 may generate the amount of change in capacitance due to the input as the data value. The input sensor 1161-2 may detect an input by a passive pen or transmit and receive data with an active pen.

The input sensor 1161-2 may also measure bio-signals such as blood pressure, moisture, or body fat. For example, when a user touches a part of his or her body to a sensor layer or sensing panel and does not move for a certain period of time, the input sensor 1161-2 may detect a bio-signal based on a change in electric field caused by the part of his or her body and output information desired by the user to the display module 1140.

The digitizer 1161-3 may generate a data value corresponding to coordinate information of the input by the pen. The digitizer 1161-3 may generate the amount of change in electromagnetic due to the input as the data value. The digitizer 1161-3 may detect an input by a passive pen or transmit and receive data with an active pen.

At least one of the fingerprint sensor 1161-1, the input sensor 1161-2, and the digitizer 1161-3 may be implemented as a sensor layer formed on the display panel 1141 through a continuous process. At least one of the fingerprint sensor 1161-1, the input sensor 1161-2, and the digitizer 1161-3 may be disposed on an upper side of the display panel 1141, and any one of the fingerprint sensor 1161-1, the input sensor 1161-2, and the digitizer 1161-3, for example, the digitizer 1161-3, may be disposed on a lower side of the display panel 1141.

At least two of the fingerprint sensor 1161-1, the input sensor 1161-2, and the digitizer 1161-3 may be formed to be integrated into one sensing panel through the same process. When integrated into one sensing panel, the sensing panel may be disposed between the display panel 1141 and a window disposed on the upper side of the display panel 1141. According to one embodiment, the sensing panel may also be disposed on the window, and the position of the sensing panel is not particularly limited.

At least one of the fingerprint sensor 1161-1, the input sensor 1161-2, and the digitizer 1161-3 may be built into the display panel 1141. That is, at least one of the fingerprint sensor 1161-1, the input sensor 1161-2, and the digitizer 1161-3 may be formed simultaneously through a process of forming elements (for example, the light emitting element, the transistor, and the like) included in the display panel 1141.

In addition, the sensor module 1161 may generate an electric signal or data value corresponding to an internal state or an external state of the electronic device 1000. The sensor module 1161 may further include, for example, a gesture sensor, a gyro sensor, a pressure sensor, a magnetic sensor, an acceleration sensor, a grip sensor, a proximity sensor, a color sensor, an infrared (IR) sensor, a biometric sensor, a temperature sensor, a humidity sensor, or a light sensor.

The antenna module 1162 may include one or more antennas for transmitting signals or power to the outside or receiving signals from the outside. According to one embodiment, the communication module 1173 may transmit signals to an external electronic device or receive signals from the external electronic device through an antenna suitable for a communication method. An antenna pattern of the antenna module 1162 may be integrated into one component (for example, the display panel 1141) of the display module 1140, the input sensor 1161-2, or the like.

The sound output module 1163 may be a device for outputting an audio signal to the outside of the electronic device 1000, and may include, for example, a speaker used for general purposes such as multimedia playback or recording playback, and a receiver used exclusively for telephone reception. According to one embodiment, the receiver may be formed integrally with or separately from the speaker. An audio output pattern of the sound output module 1163 may also be integrated into the display module 1140.

The camera module 1171 may capture a still image and a moving image. According to one embodiment, the camera module 1171 may include one or more lenses, image sensors, or image signal processors. The camera module 1171 may further include an infrared camera that can measure the presence or absence of a user, the location of a user, the line of sight of a user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000, and performance of communication through the established communication channel. The communication module 1173 may include one or both of a wireless communication module, such as a cellular communication module, a short-range wireless communication module, or a GNSS (global navigation satellite system) communication module, and a wired communication module, such as a LAN (local area network) communication module or a power line communication module. The communication module 1173 may communicate with the external electronic device 2000 via a short-range communication network such as Bluetooth, WiFi direct, or IrDA (infrared data association), or a long-range communication network such as a cellular network, the Internet, or a computer network (for example, LAN or WAN). The various types of communication modules 1173 described above may be implemented as one chip or as separate chips.

The input module 1130, the sensor module 1161, the camera module 1171, and the like may be used to control the operation of the display module 1140 in conjunction with the processor 1110.

The processor 1110 may output a command or data to the display module 1140, the sound output module 1163, the camera module 1171, or the light module 1172 based on the input data received from the input module 1130. For example, the processor 1110 may generate the image data in response to the input data received through a mouse, an active pen, or the like and output the image data to the display module 1140, or generate command data in response to the input data and output the command data to the camera module 1171 or the light module 1172. When the input data is not received from the input module 1130, the processor 1110 may switch the operation mode of the electronic device 1000 to a low power mode or sleep mode to reduce power consumption of the electronic device 1000.

The processor 1110 may output a command or data to the display module 1140, the sound output module 1163, the camera module 1171, or the light module 1172 based on sensing data received from the sensor module 1161. For example, the processor 1110 may compare authentication data authorized by the fingerprint sensor 1161-1 with the authentication data stored in the memory 1120, and then execute an application based on the comparison result. The processor 1110 may execute a command or output corresponding image data to the display module 1140 based on sensing data detected by the input sensor 1161-2 or the digitizer 1161-3. When a temperature sensor is included in the sensor module 1161, the processor 1110 may receive temperature data on the temperature measured from the sensor module 1161 and further perform luminance correction and the like on the image data based on the temperature data.

The processor 1110 may receive measurement data on the presence or absence of a user, the location of a user, the line of sight of a user, and the like from the camera module 1171. The processor 1110 may further perform luminance correction and the like on the image data based on the measurement data. For example, the processor 1110 that determines the presence or absence of a user based on an input from the camera module 1171 may output image data whose luminance is corrected through the data conversion circuit 1112-2 or the gamma correction circuit 1112-3 to the display module 1140.

Some of the components described above may be interconnected with each other through a communication method between peripheral devices, such as a bus, GPIO (general purpose input/output), SPI (serial peripheral interface), MIPI (mobile industry processor interface), or UPI (ultra path interconnect) link, to exchange signals (for example, commands or data) with each other. The processor 1110 may communicate with the display module 1140 through a mutually agreed upon interface. For example, any one of the above-described communication methods may be used, and is not limited to the above-described communication methods.

As described above, according to the one or more of the above embodiments, a display apparatus includes a display area and a peripheral area. The peripheral area is a dead space in which pixels are not arranged. The size of the peripheral area is reduced by locating a portion of the scan driving circuit in the display area and vertically stacking logic circuits of the scan driving circuit in the peripheral area. These improvements not only allow the size of the peripheral area to be reduced, they also improve the aesthetic sense of the display apparatus.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims. The embodiments may be combined to form additional embodiments.

What is claimed is:

1. A display apparatus comprising:

a substrate comprising a display area and a peripheral area outside the display area;

a scan driving circuit including a logic circuit unit and a buffer circuit unit; and a pixel circuit arranged in the display area, wherein the logic circuit unit includes a first logic circuit arranged in the peripheral area and a second logic circuit arranged in the peripheral area;

wherein the buffer circuit unit includes a first buffer circuit and a second buffer circuit, the first buffer circuit arranged on the pixel circuit in the display area and being electrically connected to the first logic circuit and configured to output a first scan signal, and the second buffer circuit arranged on the pixel circuit in the display area and being electrically connected to the second logic circuit and configured to output a second scan signal, the display apparatus further comprising:

a light-emitting diode arranged on the first buffer circuit in the display area and electrically connected to the pixel circuit, wherein the pixel circuit comprises a plurality of transistors, the first buffer circuit is electrically connected to a gate electrode of one of the plurality of transistors through a first scan line, and the second buffer circuit is electrically connected to a gate electrode of another one of the plurality of transistors through a second scan line.

2. The display apparatus of claim 1, wherein the second logic circuit is arranged on the first logic circuit in the peripheral area.

3. The display apparatus of claim 1, wherein the buffer circuit unit is disposed between the light emitting diode and the pixel circuit in a thickness direction of the display apparatus.

4. The display apparatus of claim 1, further comprising:

a third logic circuit arranged on the first logic circuit, wherein the first logic circuit and the third logic circuit are electrically connected to each other, and wherein the first buffer circuit is configured to output the first scan signal.

5. The display apparatus of claim 1, wherein the pixel circuit comprises:

a first transistor comprising a first gate electrode;

a second transistor arranged between a data line and the first gate electrode;

a third transistor arranged between a reference voltage line and the first gate electrode;

a fourth transistor arranged between an initialization voltage line and the light-emitting diode;

a fifth transistor arranged between a driving voltage line and the first transistor; and a sixth transistor arranged between the light-emitting diode and the first transistor, wherein:

the first buffer circuit is electrically connected to a gate electrode of the second transistor through a first scan line, and the second buffer circuit is electrically connected to a gate electrode of the third transistor through a second scan line.

6. The display apparatus of claim 5, further comprising:

a third logic circuit and a fourth logic circuit which are arranged in the peripheral area;

a fifth logic circuit and a sixth logic circuit which are arranged on the first logic circuit, the third logic circuit, and the fourth logic circuit in the peripheral area;

a third buffer circuit arranged on the pixel circuit in the display area, the third buffer circuit being electrically connected to the third logic circuit and configured to output a third scan signal;

a fourth buffer circuit arranged on the pixel circuit in the display area, the fourth buffer circuit being electrically connected to the fourth logic circuit and configured to output a fourth scan signal; and a fifth buffer circuit arranged on the pixel circuit in the display area, the fifth buffer circuit being electrically connected to the fifth logic circuit and configured to output a fifth scan signal.

7. The display apparatus of claim 6, wherein:

the first logic circuit and the sixth logic circuit are electrically connected to each other, and the third buffer circuit is electrically connected to a gate electrode of the fifth transistor through a third scan line, the fourth buffer circuit is electrically connected to a gate electrode of the sixth transistor through a fourth scan line, and the fifth buffer circuit is electrically connected to a gate electrode of the fourth transistor through a fifth scan line.

8. The display apparatus of claim 6, wherein:

multiple ones of the pixel circuit are provided in a plurality of pixel circuit rows, and the first to fifth buffer circuits are arranged for each of the plurality of pixel circuit rows.

9. The display apparatus of claim 6, wherein:

multiple ones of the pixel circuit are provided in a plurality of pixel circuit rows, the first buffer circuit is arranged for each of the plurality of pixel circuit rows, the third buffer circuit and the fourth buffer circuit are arranged in an odd-numbered pixel circuit row from among the plurality of pixel circuit rows, and the second buffer circuit and the fifth buffer circuit are arranged in an even-numbered pixel circuit row from among the plurality of pixel circuit rows.

10. The display apparatus of claim 1, wherein:

each of the first logic circuit, the second logic circuit, the pixel circuit, the first buffer circuit, and the second buffer circuit comprises an oxide-based semiconductor layer.

11. A display apparatus comprising:

a substrate comprising a display area and a peripheral area outside the display area;

a first layer stack arranged on the substrate;

a second layer stack arranged on the first layer stack; and a light-emitting diode layer arranged on the second layer stack, wherein the first layer stack comprises a first logic circuit arranged in the peripheral area and a pixel circuit arranged in the display area, the second layer stack comprises a second logic circuit arranged in the peripheral area and a first buffer circuit and a second buffer circuit which are arranged in the display area, wherein:

the pixel circuit comprises a plurality of transistors, the first buffer circuit is electrically connected to the first logic circuit and configured to output a first scan signal, the first scan signal to control one of the plurality of transistors of the pixel circuit in the display area, and the second buffer circuit is electrically connected to the second logic circuit and configured to output a second scan signal, the second scan signal to control another one of the plurality of transistors of the pixel circuit in the display area.

12. The display apparatus of claim 11, wherein each of the first layer stack and the second layer stack comprises an oxide-based semiconductor layer.

13. The display apparatus of claim 11, wherein:

the first layer stack further comprises a third logic circuit and a fourth logic circuit which are arranged in the peripheral area, the second layer stack further comprises a fifth logic circuit and a sixth logic circuit which are arranged in the peripheral area and a third buffer circuit, a fourth buffer circuit, and a fifth buffer circuit which are arranged in the display area, and the third buffer circuit is electrically connected to the third logic circuit and configured to output a third scan signal, the fourth buffer circuit is electrically connected to the fourth logic circuit and configured to output a fourth scan signal, and the fifth buffer circuit is electrically connected to the fifth logic circuit and configured to output a fifth scan signal.

14. The display apparatus of claim 13, wherein:

the first logic circuit and the sixth logic circuit are electrically connected to each other, and the first buffer circuit is configured to output the first scan signal.

15. The display apparatus of claim 14, wherein:

the pixel circuit comprises a first transistor comprising a first gate electrode and a second transistor arranged between a data line and the first gate electrode, and the first buffer circuit is electrically connected to a gate electrode of the second transistor through a first scan line.

16. The display apparatus of claim 13, wherein the pixel circuit comprises:

a first transistor comprising a first gate electrode;

a second transistor arranged between a data line and the first gate electrode;

a third transistor arranged between a reference voltage line and the first gate electrode;

a fourth transistor arranged between an initialization voltage line and a light-emitting diode of the light-emitting diode layer;

a fifth transistor arranged between a driving voltage line and the first transistor; and a sixth transistor arranged between the light-emitting diode and the first transistor.

17. The display apparatus of claim 16, wherein:

the second buffer circuit is electrically connected to a gate electrode of the third transistor through a second scan line, the third buffer circuit is electrically connected to a gate electrode of the fifth transistor through a third scan line, the fourth buffer circuit is electrically connected to a gate electrode of the sixth transistor through a fourth scan line, and the fifth buffer circuit is electrically connected to a gate electrode of the fourth transistor through a fifth scan line.

18. The display apparatus of claim 13, wherein:

multiple ones of the pixel circuit are provided in a plurality of pixel circuit rows, and the first buffer circuit is arranged for each of the plurality of pixel circuit rows.

19. The display apparatus of claim 18, wherein:

the third buffer circuit and the fourth buffer circuit are arranged in an odd-numbered pixel circuit row from among the plurality of pixel circuit rows, and the second buffer circuit and the fifth buffer circuit are arranged in an even-numbered pixel circuit row from among the plurality of pixel circuit rows.

20. An electronic device comprising:

a display apparatus; and a power supply circuit configured to supply power to the display apparatus, wherein the display apparatus comprises:

a substrate comprising a display area and a peripheral area outside the display area;

a scan driving circuit including a logic circuit unit and a buffer circuit unit, and a pixel circuit arranged in the display area, wherein the logic circuit unit includes a first logic circuit arranged in the peripheral area and a second logic circuit arranged in the peripheral area;

wherein the buffer circuit unit includes a first buffer circuit and a second buffer circuit, the first buffer circuit arranged on the pixel circuit in the display area and being electrically connected to the first logic circuit and configured to output a first scan signal, and the second buffer circuit arranged on the pixel circuit in the display area and being electrically connected to the second logic circuit and configured to output a second scan signal, the display apparatus further comprising:

a light-emitting diode arranged on the first buffer circuit in the display area and electrically connected to the pixel circuit, wherein the second logic circuit is arranged on the first logic circuit in the peripheral area.

* * * * *